United States Patent
Wang et al.

(10) Patent No.: US 10,440,594 B2
(45) Date of Patent: Oct. 8, 2019

(54) QUANTUM INTRADAY ALERTING BASED ON RADIO ACCESS NETWORK OUTLIER ANALYSIS

(71) Applicant: AT&T Mobility II LLC, Atlanta, GA (US)

(72) Inventors: Ching-Fang Wang, Sammamish, WA (US); Shawn Dugan, Pittsburgh, PA (US); William Wiese, Anaheim, CA (US); Zhou Wu, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 104 days.

(21) Appl. No.: 15/019,952

(22) Filed: Feb. 9, 2016

(65) Prior Publication Data

US 2017/0230846 A1    Aug. 10, 2017

(51) Int. Cl.
*H04W 24/10* (2009.01)
*H04W 24/08* (2009.01)
*H04W 24/04* (2009.01)

(52) U.S. Cl.
CPC ............ *H04W 24/04* (2013.01); *H04W 24/08* (2013.01); *H04W 24/10* (2013.01)

(58) Field of Classification Search
None
See application file for complete search history.

(56) References Cited

U.S. PATENT DOCUMENTS

| 7,564,952 B2 | 7/2009 | Kikuchi |
| 8,908,507 B2 | 12/2014 | Kovvali et al. |
| 9,172,608 B2 | 10/2015 | Zeyliger et al. |
| 2009/0154367 A1* | 6/2009 | Aaron .................... H04L 67/32 370/252 |

(Continued)

FOREIGN PATENT DOCUMENTS

| WO | 2015057119 | 4/2015 |
| WO | 2015062652 | 5/2015 |
| WO | 2015113636 | 8/2015 |

OTHER PUBLICATIONS

Ouyang, Ye, et al. "A Performance Analysis for UMTS Packet Switched Network Based on Multivariate KPIs." International Journal of Next-Generation Networks (IJNGN), vol. 2, No. 1, Mar. 2010: 80-94.*

(Continued)

*Primary Examiner* — Ajit Patel
(74) *Attorney, Agent, or Firm* — Amin, Turocy & Watson, LLP

(57) ABSTRACT

Determining RAN performance outlier information is disclosed. In an aspect, RAN data for a current condition can be analyzed in view of historical RAN data to determine if the current condition in atypical and represents an outlier condition. In an aspect, historically similar environments between the historical and current RAN data can allow the analysis to have increased relevance. The disclosure can employ a binary array to facilitate determining performance outlier information. In an aspect, the present disclosure can (Continued)

be performed in a distributed computing environment and is scalable to manage large data volumes. Performance outlier information can be employed in alerts, scheduling repair, planning hardware or software upgrades, tracking rollout of new features, etc.

20 Claims, 12 Drawing Sheets

(56) References Cited

U.S. PATENT DOCUMENTS

| | | | |
|---|---|---|---|
| 2013/0053023 A1* | 2/2013 | Meredith | H04W 24/08 |
| | | | 455/423 |
| 2014/0164585 A1* | 6/2014 | Shaw | H04L 41/5025 |
| | | | 709/223 |
| 2014/0200989 A1 | 7/2014 | Cohen Kassko et al. | |
| 2015/0127646 A1 | 5/2015 | Shaw | |
| 2015/0312831 A1 | 10/2015 | Sang et al. | |
| 2016/0274558 A1* | 9/2016 | Strohmenger | G05B 19/0428 |
| 2016/0381580 A1* | 12/2016 | Kwan | H04W 24/08 |
| | | | 370/252 |
| 2017/0013484 A1* | 1/2017 | Liu | H04W 24/04 |
| 2017/0094537 A1* | 3/2017 | Yang | H04W 24/04 |

OTHER PUBLICATIONS

Li, Rongpeng, et al. "The prediction analysis of cellular radio access network traffic: From entropy theory to networking practice." Communications Magazine, IEEE 52.6 (2014): 234-240.
Matti, M. O. N. A., et al. "Applying Big-Data Technologies to Network Architecture." Ericsson Review 284 (2012): 23-3181.

\* cited by examiner

| | KPI-1 | KPI-2 | KPI-3 | KPI-4 | KPI-5 | KPI-6 | KPI-7 | KPI-8 | KPI-9 | KPI-10 | KPI-11 | KPI-12 | KPI-13 | Correlation Coefficient |
|---|---|---|---|---|---|---|---|---|---|---|---|---|---|---|
| KPI (%) | 0.56 | 0.54 | 0.53 | 0.55 | 0.57 | 0.55 | 0.54 | 0.53 | 0.96 | 1.39 | 1.4 | 3.25 | 3.35 | |
| Row 1 | 0 | 1 | 1 | 1 | 1 | 1 | 1 | 1 | 1 | 1 | 1 | 1 | 1 | 0.1697 |
| Row 2 | 0 | 0 | 1 | 1 | 1 | 1 | 1 | 1 | 1 | 1 | 1 | 1 | 1 | 0.2551 |
| Row 3 | 0 | 0 | 0 | 1 | 1 | 1 | 1 | 1 | 1 | 1 | 1 | 1 | 1 | 0.3314 |
| Row 4 | 0 | 0 | 0 | 0 | 1 | 1 | 1 | 1 | 1 | 1 | 1 | 1 | 1 | 0.4022 |
| Row 5 | 0 | 0 | 0 | 0 | 0 | 1 | 1 | 1 | 1 | 1 | 1 | 1 | 1 | 0.4729 |
| Row 6 | 0 | 0 | 0 | 0 | 0 | 0 | 1 | 1 | 1 | 1 | 1 | 1 | 1 | 0.5538 |
| Row 7 | 0 | 0 | 0 | 0 | 0 | 0 | 0 | 1 | 1 | 1 | 1 | 1 | 1 | 0.6477 |
| Row 8 | 0 | 0 | 0 | 0 | 0 | 0 | 0 | 0 | 1 | 1 | 1 | 1 | 1 | 0.7615 |
| Row 9 | 0 | 0 | 0 | 0 | 0 | 0 | 0 | 0 | 0 | 1 | 1 | 1 | 1 | 0.8322 |
| Row 10 | 0 | 0 | 0 | 0 | 0 | 0 | 0 | 0 | 0 | 0 | 1 | 1 | 1 | 0.8633 |
| Row 11 | 0 | 0 | 0 | 0 | 0 | 0 | 0 | 0 | 0 | 0 | 0 | 1 | 1 | 0.9495 |
| Row 12 | 0 | 0 | 0 | 0 | 0 | 0 | 0 | 0 | 0 | 0 | 0 | 0 | 1 | 0.6576 |
| Row 13 | 1 | 0 | 0 | 0 | 0 | 0 | 0 | 0 | 0 | 0 | 0 | 0 | 0 | -0.1697 |
| Row 14 | 1 | 1 | 0 | 0 | 0 | 0 | 0 | 0 | 0 | 0 | 0 | 0 | 0 | -0.2551 |
| Row 15 | 1 | 1 | 1 | 0 | 0 | 0 | 0 | 0 | 0 | 0 | 0 | 0 | 0 | -0.3314 |
| Row 16 | 1 | 1 | 1 | 1 | 0 | 0 | 0 | 0 | 0 | 0 | 0 | 0 | 0 | -0.4022 |
| Row 17 | 1 | 1 | 1 | 1 | 1 | 0 | 0 | 0 | 0 | 0 | 0 | 0 | 0 | -0.4729 |
| Row 18 | 1 | 1 | 1 | 1 | 1 | 1 | 0 | 0 | 0 | 0 | 0 | 0 | 0 | -0.5538 |
| Row 19 | 1 | 1 | 1 | 1 | 1 | 1 | 1 | 0 | 0 | 0 | 0 | 0 | 0 | -0.6477 |
| Row 20 | 1 | 1 | 1 | 1 | 1 | 1 | 1 | 1 | 0 | 0 | 0 | 0 | 0 | -0.7615 |
| Row 21 | 1 | 1 | 1 | 1 | 1 | 1 | 1 | 1 | 1 | 0 | 0 | 0 | 0 | -0.8322 |
| Row 22 | 1 | 1 | 1 | 1 | 1 | 1 | 1 | 1 | 1 | 1 | 0 | 0 | 0 | -0.8633 |
| Row 23 | 1 | 1 | 1 | 1 | 1 | 1 | 1 | 1 | 1 | 1 | 1 | 0 | 0 | -0.9495 |
| Row 24 | 1 | 1 | 1 | 1 | 1 | 1 | 1 | 1 | 1 | 1 | 1 | 1 | 0 | -0.6576 |

| 01 Pattern | KPI-1 | KPI-2 | KPI-3 | KPI-4 | KPI-5 | KPI-6 | KPI-7 | KPI-8 | KPI-9 | KPI-10 | KPI-11 | KPI-12 | KPI-13 | r value |
|---|---|---|---|---|---|---|---|---|---|---|---|---|---|---|
| KPI | 0.56% | 0.54% | 0.53% | 0.55% | 0.57% | 0.55% | 0.54% | 0.53% | 0.96% | 1.39% | 1.40% | 3.25% | 3.35% | 0.95 |
| Failures | 6 | 5 | 5 | 6 | 6 | 6 | 5 | 5 | 10 | 14 | 14 | 33 | 35 | |
| Events | 1063 | 926 | 943 | 1093 | 1053 | 1091 | 926 | 943 | 1045 | 1009 | 997 | 1017 | 1046 | |

| | | |
|---|---|---|
| Baseline KPI Value | 0.74% | (sum of Failures from KPI-1 to KPI-11) / (sum of Events from KPI-1 to KPI-11) |
| Baseline Failures | 7.73 | (Baseline KPI Value) x (Events on KPI-13) |
| Extra Failure Value | 27.27 | (Failures for KPI-13) – (Baseline Failures) |

FIG. 7

QUANTUM INTRADAY ALERTING BASED ON RADIO ACCESS NETWORK OUTLIER ANALYSIS

TECHNICAL FIELD

The disclosed subject matter relates to an analysis of radio access network (RAN) performance, e.g., for determining RAN performance outlier conditions.

BACKGROUND

By way of brief background, conventional analysis of radio access network (RAN) conditions is often based simply on manipulations of current RAN performance values. These conventional techniques generally ignore historically similar performance. Moreover, conventional techniques can be considered rudimentary, for example, flagging a RAN based on a current performance indicator exceeding a threshold value. As such, conventional analysis of RAN performance can be improved upon, which can result in, for example, a reduction in false alerts to a underperforming RAN that can, in turn, reduce costs associated with responding to a false alert.

BRIEF DESCRIPTION OF DRAWINGS

FIG. 7 illustrates example RAN performance data corresponding to an example performance outlier condition, and additional example performance outlier information than can be determined in accordance with aspects of the subject disclosure.

DETAILED DESCRIPTION

Figure 1:
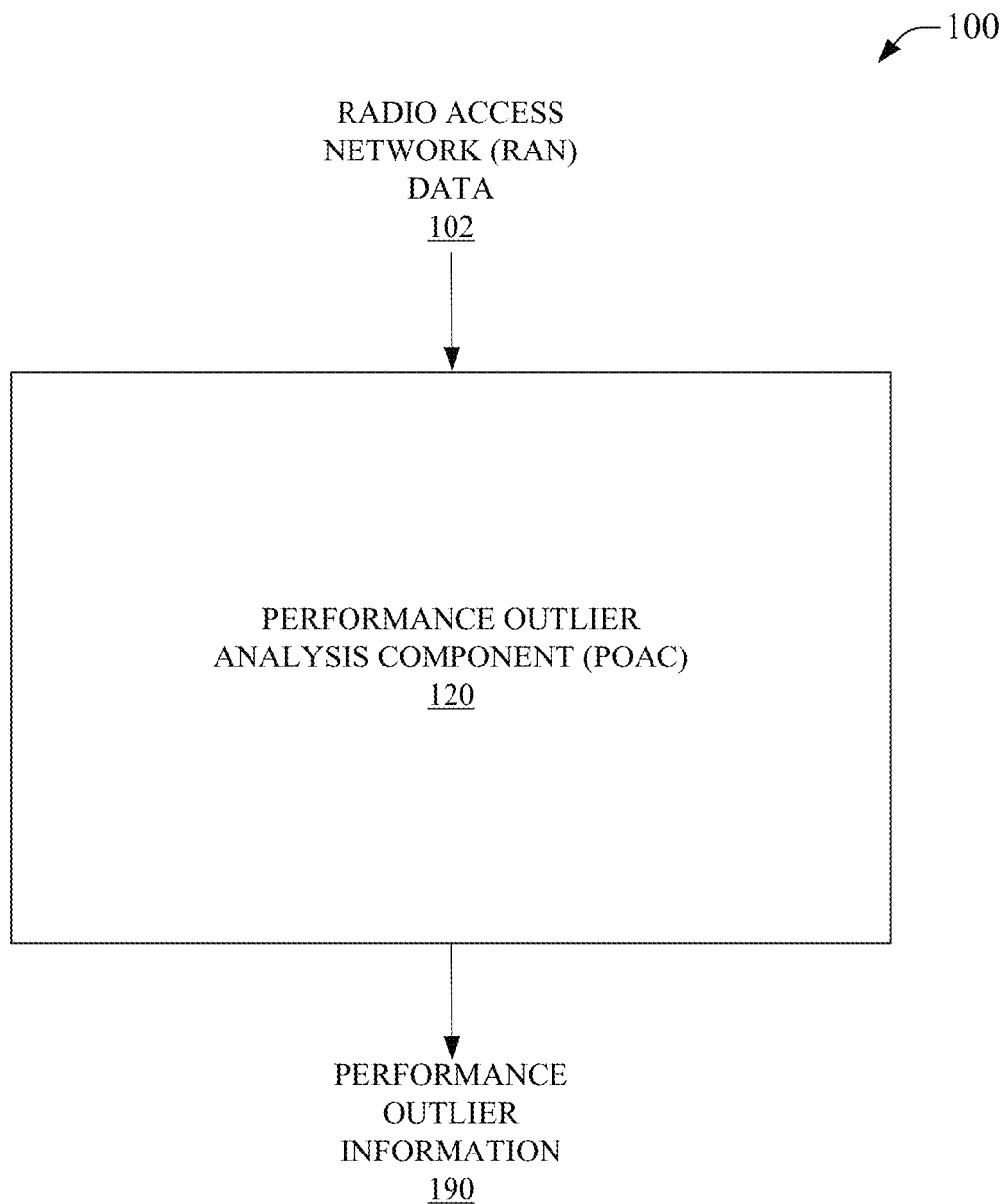
FIG. 1 is an illustration of an example system that facilitates initiating an alert based on performance outlier analysis in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional analysis of radio access network (RAN) conditions is often based simply on manipulations of RAN performance values reflecting only current RAN conditions. These conventional techniques generally ignore RAN performance in historically similar environments. Moreover, conventional techniques can generally be considered rudimentary. As an example, a RAN can be flagged as underperforming based merely on a current performance indicator exceeding a fixed threshold value, which can result in, for example, a false alert associated with a response cost that might be otherwise avoidable. The alert can be false, for example, where the performance is characteristic of the RAN device in a historically similar environment.

Historically similar environments can be related to time, location, political/cultural/sporting events, weather patterns/conditions, emergencies/disasters, hardware or software malfunctions or errors of a computer/device associated with a RAN, etc. As an example, a historically similar environment can be associated with inflow rush hour traffic, e.g., RAN data for the last 12 Mondays from 8 am-9 am, etc. A further example historically similar environment can be related to lunch times at a large employer, e.g., RAN data from noon-1 pm for the last 15 business days (e.g., excluding Sat, Sun), etc. As a still further example of a historically similar environment, RAN usage during a sporting event or for a type of sporting event can be identified, e.g., RAN data for a 15 minute interval immediately prior to an professional football game start time for each game in the season, which can be distinct from a historically similar environment for a 15 minute interval immediately prior to a college or high school football game, a soccer game, a hockey game, etc., and which can further be distinct historically similar environments between afternoon games, evening games, etc. It is to be noted that use of RAN data associated with a historically similar environment can allow RAN performance analysis to identify fewer false outliers than an analysis that ignores historical data, and more especially that ignores historically similar environment data, because a RAN is presumed to operate similarly for each historically similar environment. As such, where, for example, a RAN device demonstrates higher failure rates during high call volumes associated with seasonal heavy snowfall, it can be expected that a current high fail rate for the RAN device on a sunny dry day is more likely to be an actual failure condition than if the higher fail rate were occurring during heavy snow. Nearly any selection criteria and data can be employed in selecting historical RAN data associated with a historically similar environment to current RAN key performance indicators (KPIs) being analyzed for outlier behavior, and all such selection criteria, data, and techniques are within the scope of the instant disclosure despite not being enumerated for the sake of clarity and brevity. Moreover, the selection of historically relevant RAN data, e.g., historical RAN data associated with a historically similar environment, can be simple, e.g., for a particular time window on a daily period, etc., to more complex, e.g., at one minute intervals during a non-commercial segments of Friday night first run showings a popular nightly television program, etc. Construction of selection rules/criteria, and/or exclusion rules criteria, can be considered engineering decisions, all of which are within the scope of the present disclosure.

RAN performance outlier analysis can relate to any measurable value related to RAN devices. Of note, a RAN can be a macro level RAN, e.g., a cellular network RAN, or another RAN, e.g., a femtocell, picocell, corporate wireless LAN, etc. In an aspect, performance outlier analysis can relate to KPIs. These can facilitate determinations about RAN performance. As examples, RAN information can comprise metrics such as total calls, failed calls, dropped calls, failure rates, handover drops, throughput rates, latency, etc. Outliers can indicate changes in the operation of a RAN. In an aspect, a change in the operation of a RAN can result from changes in the RAN environment, such as those disclosed herein with regard to historically similar RAN environments, such that, the change affects how a user might experience service via a RAN. As an example, a RAN device can manage a moderate level of wireless links without notable failure counts, however, under higher loads the RAN device can demonstrate worsening performance, e.g., a RAN device can operate satisfactorily early in the morning, then operate non-satisfactorily at rush hour, then return to satisfactory operation after rush hour. This example change in performance can be due to an inherent limitation of a properly operating RAN device, can be due to unusual demands placed on the RAN device during a particularly busy rush hour, can be due to equipment failure of the RAN device, can be due to non-optimized RAN device parameters, can be due to a software glitch in the RAN or affiliated device, etc.

Detection of the change from satisfactory to non-satisfactory (or the converse) can be important in providing a valuable consumer experience on a wireless network by indicating needed upgrades, repairs, software patching, deployment of additional RAN devices in congested areas, etc. However, conventional techniques can flag an otherwise normally operating RAN device at every rush hour, where the increase in traffic decreases RAN device performance for example. This can divert resources from addressing other actually non-normally operating RAN devices. The instant disclosure enables analysis that considers the typical performance of a normally operating RAN device in historically similar environments, e.g., it can consider the typical performance of a subject RAN device in a current rush hour to how it performed in previous rush hours to help determine if the lack of performance is unusual for that RAN device in that environment. This can allow a RAN that simply under performs regularly in a particular environment to be detected as underperforming but also identified as an outlier when the underperformance is unusual even for that device in said environment. This can, for example, allow resources to be more effectively deployed to devices that are both under-performers and outliers before being directed to underperformers that are not outliers. As another example, a RAN device can drop more calls with increased load, such as from large numbers of people attending a football game. Where the football team is having a great season, attendance at the game can be even higher than normal, this can cause even greater numbers of dropped calls for the RAN device. This unusual increase in dropped calls, related to a winning football team, can be detected via the instant disclosure as an outlier, e.g., a statistical change in the performance of the RAN device in comparison to the historic performance of the same device during other football games. This can allow the network operator to address this issue, perhaps with greater urgency than they might have were the football team having a normal, rather than excellent, year.

In an aspect, the amount of data to be analyzed for more than a few RAN devices can be noteworthy. To this end, aspects of the presently disclosed subject matter can be performed in a distributed computing environment, cluster computing environment, etc. As an example, the present disclosure can be executed in an Apache™ Spark™ cluster, etc., which can allow spreading computational work across a plurality of data nodes and/or clusters, with data redundancy, scalability, and in-process memory processing on low-cost commodity hardware. This aspect can be increasingly important as internet of things (IOT) devices become more ubiquitous and communicate wirelessly with macro-RANs, femtocells, picocells, and other wireless network access systems. In some embodiments, RAN devices can compute current KPI values, store historic KPI values, associate those values to historic environment values, select which historic KPI values are relevant, etc., and enable access to this information to facilitate performance outlier analysis in a distributed and/or centralized manner. As an example, a RAN with this technology can perform outlier analysis and request attention when an outlier is detected, can provide access to the outlier analysis to allow a centralized system to determine how to respond to an outlier, can source KPI and relevant historic KPI information to a centralized analysis component, etc.

Outlier analysis can determine a relationship between a first KPI and one or more historic KPIs. In some embodiments, the KPIs, both first and historic, can be combined with a binary array to allow for determination of a correlation coefficient. In certain embodiments, the correlation coefficient can be a Pearson correlation, also known as the Pearson Product Moment Correlation (PPMC) and frequently denoted as 'r' (rho). In PPMC, the closer rho is to +/−1, the stronger the correlation and the closer to zero the lower the correlation. As such, the use of the binary array can allow for KPI values satisfying a rule related to a trigger value to be used as 'normal' and other KPI values not satisfying the rule to be treated as 'non-normal'. This distinction can enable the KPIs to be used in determining metrics related to a RAN device. As an example, a sudden uptick in failures, such going from 5 per 1000 to 35 per 1000, can present as a high rho value, such as 0.95+, this can allow older and lower failure rates (5 per 1000) to be used to determine a baseline failure rate that can be leveraged to determine an measurable change in failures associated with the outlier, such as +30 failures per 1000 over baseline for a historically similar environment.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates initiating an alert based on performance outlier analysis in accordance with aspects of the subject disclosure. System 100 can comprise performance outlier analysis component (POAC) 120. POAC 120 can receive radio access network (RAN) data 102. RAN data 102 can comprise current information related to a RAN device. RAN data 102 can further comprise historic information related to a RAN device. In some embodiments, RAN data 102 can comprise key performance indicators (KPIs) related to operation of a RAN device. As examples, RAN data 102 an comprise information related to events such as establishing and/or maintaining a call/data session, handoffs, dropped calls/data sessions, reestablished calls/data sessions, throughput, jitter, bandwidth, device identification, RAN device environment, e.g., time, date, weather, events, network traffic, vehicular or pedestrian traffic, software versions, operational uptime, repair information, hardware characteristics including temperature, versions, voltage, current, power, etc., position, rankings, self-organizing network information, network routing information, etc. Nearly any data associated with the operation of a RAN device or the environment and characteristics of the RAN device or associated network can be part of RAN data 102 and can be current or historical in nature.

POAC 120 can determine, based on RAN data 102, performance aspects of a RAN device or associated network, including information related to atypical or anomalistic behavior, e.g., a performance outlier. A performance outlier can be related to RAN device related values that are outside of a determined or specified normal operation parameter. In an aspect, a performance outlier can be directly identified where a value is determined to satisfy a rule related to the normal value ascribed to the associated performance parameter, for example, a higher than normal operating temperature for a processor of a RAN device can be determined to be a performance outlier. In another aspect, a performance outlier can be determined based on analysis of RAN data 102 to determine atypical behavior, e.g., a high level of processor usage can be analyzed to determine that a software feature is stuck in a loop and be flagged as a performance outlier. This analytical aspect can be expanded to determine outliers based on historical performance. As an example, where a RAN device located in a grassy flat region experiences less than 0.1% dropped call rate on average, based on historical data, a KPI indicating a 0.9% drop call rate can be determined to be an outlier. However, where a similar RAN device is located in a hilly and densely treed area, with a historical average of, for example, 0.87% dropped call rate the same 0.9% value can be determined to be within normal operating range. In an aspect, the instant disclosure can enable determination of normal behavior for a RAN device with regard to historically similar environments. As an example, the example RAN device with a historical average of 0.87% can receive a hardware upgrade that can decrease the number of dropped calls. The historical average will therefore decrease from 0.87% over time, however, where the instant disclosure is applied, dropped call rates, for example, from before the hardware upgrade can be statistically compensated for such that a current 0.9% drop rate can be determined to be an outlier in view of lower drop rates since the hardware upgrade.

POAC 120 can be employed to automate outlier analysis for RAN devices. This can support scalable application of outlier analysis to a plurality of RAN devices, e.g., the large number of RAN device associated with a wireless carrier access network, ad hoc additions of femtocells, etc. Moreover, POAC 120 can facilitate analysis of large amounts of data, such as can be received from a wireless access network at the carrier or enterprise level. In some embodiments, massive amounts of data can be quickly processed in an efficient manner by employing distributed computing paradigms, for example, on a Linux cluster with Spark data nodes.

POAC 120 can facilitate access to performance outlier information 190. Performance outlier information 190 can comprise information related to analysis of RAN data 102 via POAC 120. In some embodiments, performance outlier information 190 can comprise identification of a RAN device determined to have an outlying parameter or condition. As an example, performance outlier information 190 can comprise a list of RAN devices determined to have outlying operation values to aid in directing resources to correcting the outlying operation, e.g., repairs, upgrades, resets, etc. Performance outlier information 190 can comprise, in some embodiments can further comprise other information related to a RAN device or analysis of RAN data 102. In a related embodiment, performance outlier information 190 can comprise information related to a historically similar environment for a RAN associated with an outlier value, identification of an event associated with evolution of an outlier value, e.g., information indicating the rapid onset of an outlier condition, indicating that the value has only been slowly degrading until it reaches an outlier condition, etc., an alert, a flag, a request for response, etc. As an example, performance outlier information 190 can include an alarm trigger, a determined outlier value, identification of the RAN device associated with the outlier value, and information indicating that a political rally occurred within the coverage area of the identified RAN device proximate in time to the determined outlier event. This example illustrates that while the alert can occur, additional information can be included that can allow a user to determine if a response is appropriate, e.g., in this example, a repair crew might not be dispatched where the outlier condition is attributable to the presence of the political rally. In another example, where an upgrade has been applied to a RAN device, an outlier can be determined related to improved performance, e.g., data throughput for the upgraded RAN device can increase, dropped call numbers can decrease, etc., which can enable tracking network management efforts, etc.

In an aspect, system 100 can enable outlier analysis to be performed in view of historical metrics associated with a RAN device, e.g., macro RAN device, femtocells, etc. Historical metrics, as disclosed herein, can be related to historically similar environments for a RAN device, e.g., historical metrics from the RAN device in similar conditions can provide information of higher relevance. Moreover, historical RAN data can be of nearly any depth, e.g., it may be none, some or all historical data for the RAN device being analyzed. As an example, a current RAN data value can be analyzed in view of 12 data points for a historically similar environment for the RAN device, such as connected call data for today from 8 am to 9 am and from the last 12 business days from 8 am to 9 am, or from this Monday from 8 am to 5 pm and the previous 12 Mondays from 8 am to 5 pm, etc. Of note, more granular metrics, e.g., a 5-minute window as compared to a 1-hour window, an 8-hour window, a 24-hour window, etc., can provide increased specificity, e.g., when an outlier occurs, cause of an outlier event, etc., but can be expected to increase the frequency of outlier analysis process.

Wherein the disclosed subject matter is scalable, outlier analysis can be performed as frequently as needed for a given computational budget, e.g., more frequent outlier analysis that can yield increasingly granular outlier detection, can be accommodated by higher speed processors and/or distributed computing technologies, e.g., interval analysis of devices comprising a RAN for a national cellular provider can typically be performed more frequently in a distributed computing environment or on clusters of machines than can be performed on a single device, more especially in view of general economic aspects associated with deploying a single machine capable of these large scale computing tasks. However, in another example, a single machine can employ these techniques where less frequent, and less granular outlier analysis, is needed for fewer RAN devices, e.g., a femtocell access point (FAP) can perform outlier analysis and then communicate relevant results to a central system in near real time within the scope of the disclosed subject matter. In an aspect, historical data can become stale and be or lesser value, however, the depth of historical data can be an engineering decision, e.g., which can be determined and included in a profile, e.g., via performance profile component 360, 460, etc. As an example, while a large number of historical values can exist for a RAN device, such as 1.5M values, a relevant number can be a smaller number of values, such as 1, 2, 5, 8, 12, 60, 100, 1000, etc., wherein the number of computations can be reduced with a lower number of values while still retaining sufficient accuracy to determine an outlier condition related to the RAN metric under analysis, e.g., where 60 values results in similar outlier detection to 1.5M values, determinations made with 60 values can be significantly less computationally intensive than processing the 1.5M values. Similarly, where 12 values are sufficient in view of defined analytical goals, processing 12 values can be less computationally intense than processing 60 values. Where RAN metric analysis can occur at a designated interval to provide a desired granularity an outlier detection, and across a number of devices, such as those comprising an access network for a national-scale wireless carrier, balancing the number of computations against the cost and provisioning of those computations can be an important consideration. The instant disclosure supports scalable analysis, e.g., via distributed computation, etc., that can allow increases/decreases in historical data depth, number of RAN devices analyzed, and granularity of outlier detection in a controllable manner allowing for adapting the complexity of analysis in view of other considerations such as cost, time, resource consumption, etc.

Figure 2:
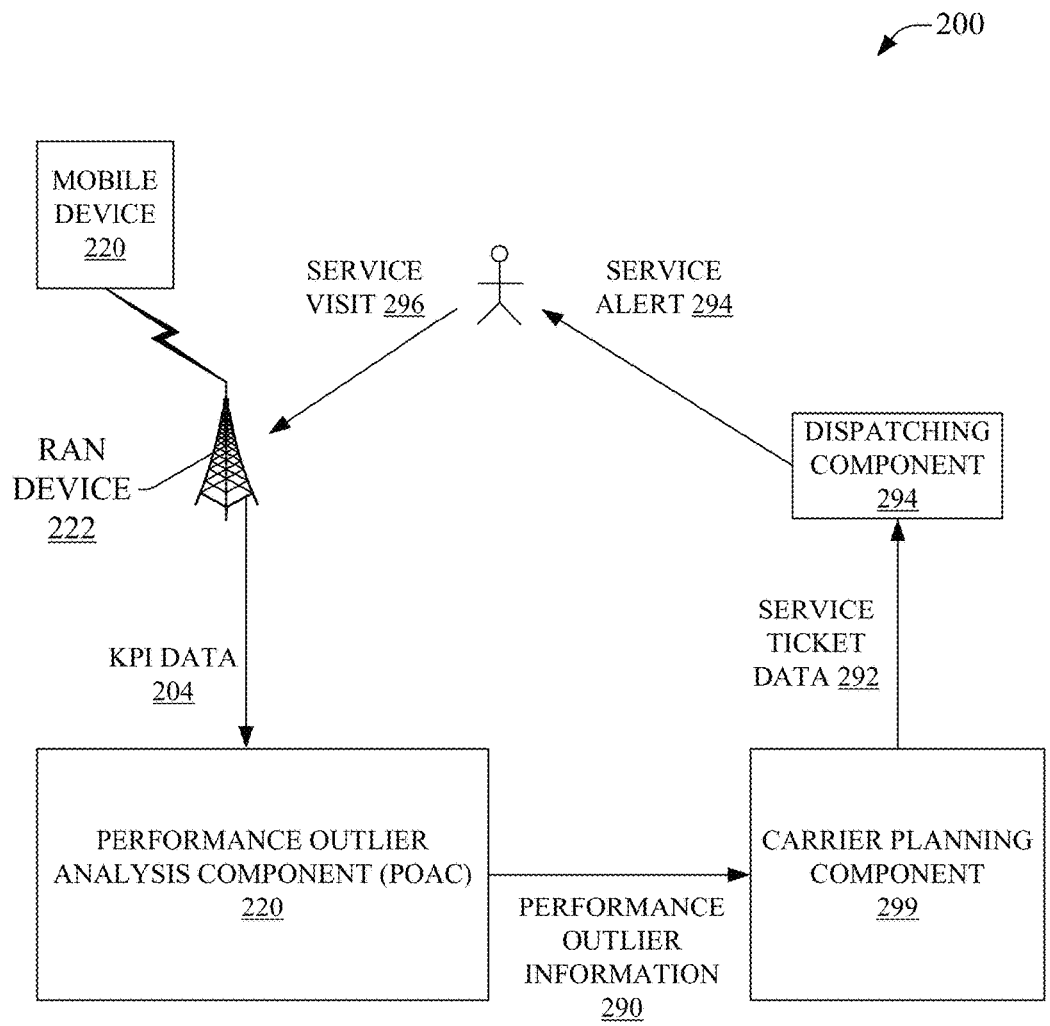
FIG. 2 is a depiction of an example system that facilitates responding to a determined RAN performance condition based on performance outlier analysis in accordance with aspects of the subject disclosure.

FIG. 2 is a depiction of a system 200 that can facilitate responding to a determined RAN performance condition based on performance outlier analysis in accordance with aspects of the subject disclosure. System 200 can comprise POAC 220. POAC 220 can receive RAN data, not illustrated. RAN data can comprise current information related to a RAN device. RAN data that can comprise KPI data 204 related to RAN 222. KPI data 204 can further comprise historic KPI information related to the historical performance of RAN device 222. As examples, KPI data 204 can comprise information related to events such as establishing and/or maintaining a call/data session, handoffs, dropped calls/data sessions, reestablished calls/data sessions, throughput, jitter, bandwidth, device identification, RAN device environment, e.g., time, date, weather, events, network traffic, vehicular or pedestrian traffic, software versions, operational uptime, repair information, hardware characteristics including temperature, versions, voltage, current, power, etc., position, rankings, self-organizing network information, network routing information, etc. Nearly any data associated with the operation of RAN device 222 or the environment and characteristics of RAN device 222 or an associated network can be part of KPI data 204 and can be current or historical in nature.

POAC 220 can determine, based on KPI data 204, performance aspects of RAN device 222 or an associated network, including information related to unusual behavior, e.g., a performance outlier. A performance outlier can be related to RAN device metrics that are outside of a normal operation parameter. In an aspect, a performance outlier can be directly identified where a metric is determined to satisfy a rule related to a normal value ascribed to the associated performance parameter, for example, a higher power consumption at RAN device 222 can be determined to be a performance outlier, e.g., it can be determined that RAN device 222 is drawing more power than manufactures specifications indicate the device should be drawing. In another aspect, a performance outlier can be determined based on analysis of KPI data 204 to determine atypical behavior, e.g., a high level of call events can be analyzed to determine that traffic via RAN device 222 has increased and can be flagged as a performance outlier. This analytical aspect can be expanded to determine outliers based on historical performance. As an example, where RAN device 222 historically supports 1000 call events per hour based on historical data, a KPI indicating 1800 call events can be determined to be an outlier. In an aspect, the instant disclosure can enable determination of normal behavior for a RAN device with regard to historically similar environments. As an example, where RAN device 222 typically supports 1000 call events per hour on weekends, 1800 events per hour on a weekday can be uncorrelated due to a dissimilar historical environment, e.g., weekend event counts can be distinct historically from weekday event counts. However, where a current weekend event count is, for example 2200 events per hour, this can be determined to be a performance outlier in view of the historically similar environment data, e.g., the historical weekend event count being around 1000 events per hour.

POAC 220 can be employed to automate outlier analysis for RAN devices, e.g., RAN device 222, etc. This can support scalable application of outlier analysis to a plurality of RAN devices, e.g., the large number of RAN devices, including RAN device 222, associated with a wireless carrier access network, etc. Moreover, POAC 220 can facilitate analysis of large amounts of data, such as can be received from a wireless access network at the carrier or enterprise level. In some embodiments, massive amounts of data can be quickly processed in an efficient manner by employing distributed computing paradigms, for example, on a Linux cluster or other distributed computing system.

POAC 220 can facilitate access to performance outlier information 290. Performance outlier information 290 can comprise information related to analysis of KPI data 204 via POAC 220. In some embodiments, performance outlier information 290 can comprise identification of RAN device 222 and a determined outlying parameter, such as related to sessions between mobile device 220 and RAN device 222, etc. As an example, performance outlier information 290 can comprise a list of RAN devices determined to have outlying operation values, including RAN device 222, to aid in directing resources to respond to the outlying operational parameter, e.g., repairs, upgrades, resets, etc. Performance outlier information 290 can comprise, in some embodiments, other information related to RAN device 222 or analysis of KPI data 204. In a related embodiment, performance outlier information 290 can comprise information related to a historically similar environment for RAN device 222, identification of an event associated with evolution of an outlier value, an alert, a flag, a request for response, etc. As an example, performance outlier information 290 can include an alarm trigger, a determined outlier value, identification of RAN device 222, and information related to an environment of RAN device 222 to aid in identifying historically similar environments for RAN device 222. This example illustrates that while the alert can occur, additional information can be included that can allow other devices/users to determine if a response is needed.

System 200 can further comprise carrier planning component 299 that can receive performance outlier information 290. Carrier planning component 299 can support or enable planned allocation of carrier resources, such as allocation of a repair resource in response to a determined performance outlier condition. In an embodiment, carrier planning component 299 can enable access to service ticket data 292. Service ticket data 292 can comprise information facilitating applying service to RAN device 222. The application of service to RAN device 222 can, in some embodiments, be related to responding to a determined service outlier, e.g., determined via POAC 220 based on KPI data 204 and determined to be actionable via carrier planning component 299.

Dispatching component 294, of system 200, can receive service ticket data 292 and, in response, can cause service alert 294 to be received by a technician, e.g., a repair or service vendor technician, that can perform service visit 296 to RAN device 222. As such, system 200 illustrates effecting a response to determining an outlying value in KPI data 204 related to RAN device 222. The response can comprise determining the presence of an outlier value, e.g., based on a historically similar environment for RAN device 222, assessing the impact of the determined outlier via carrier planning component 299, and triggering a response, e.g., generating a service ticket. The service ticket can cause service to be given to RAN device 222, e.g., via dispatching component 294 causing a service alert and a corresponding service visit being undertaken. In some embodiments, dispatching component 294 can be part of a system different from a network carrier system, e.g., a vendor system, a contractor system, etc. Similarly, service alert 294 can be responded to by third party service technicians. In some embodiments, KPI data 204 can be made available to POAC 220 via third party systems, e.g., RAN device 222 can be a privately operated RAN device and associated KPI data can be sent from the private operator system to a network carrier system comprising POAC 220. In other embodiments, RAN device 222 can be operated by a network carrier but packaging of KPI data 204 can be via a vendor or other third party system before being delivered to POAC 220. In some embodiments, KPI data 204 can be received at POAC 220 from a plurality of sources, including a network carrier source and/or a non-network carrier source, for one or more RAN device including RAN device 222, e.g., some KPIs for RAN device 222 can be received as KPI data 204 by POAC 220 from network carrier systems while other KPIs for RAN device 222 can be received as KPI data 204 by POAC 220 from non-network carrier systems.

In an aspect, system 200 can enable outlier analysis to be performed in view of historical metrics associated with RAN device 222. Historical metrics, as disclosed herein, can be related to historically similar environments for RAN device 222, e.g., historical metrics from RAN device 222 in similar operating conditions can provide more relevant information than historical information for dissimilar operating conditions. Moreover, historical RAN data can be of nearly any depth, e.g., it may be none, some or all historical data for RAN device 222. Whereas outlier analysis, as disclosed, is scalable, it can be performed as frequently as needed for a desired level of granularity, e.g., more frequent outlier analysis that can yield increasingly granular outlier detection. Moreover, highly granular outlier detection can be accommodated by high speed processors and/or distributed computing technologies, e.g., shorter intervals of analysis, for example, every 5 minutes rather than every 5 hours, can typically be more computationally intensive and can be performed efficiently in a scalable distributed computing environment, e.g., on clusters of machines enabling scaling of processors assigned to the analysis. Distributed computing can be more cost effective than deploying a single machine capable of these voluminous computing tasks. Of note, while distributed computing is expressly recited, it does not foreclose use of a single machine, e.g., where the single machine is capable of the typically large volumes of data to be analyzed, or where less granular outlier analysis is acceptable, e.g., for fewer RAN devices, less frequent analysis, less historical data depth, etc.

Figure 3:
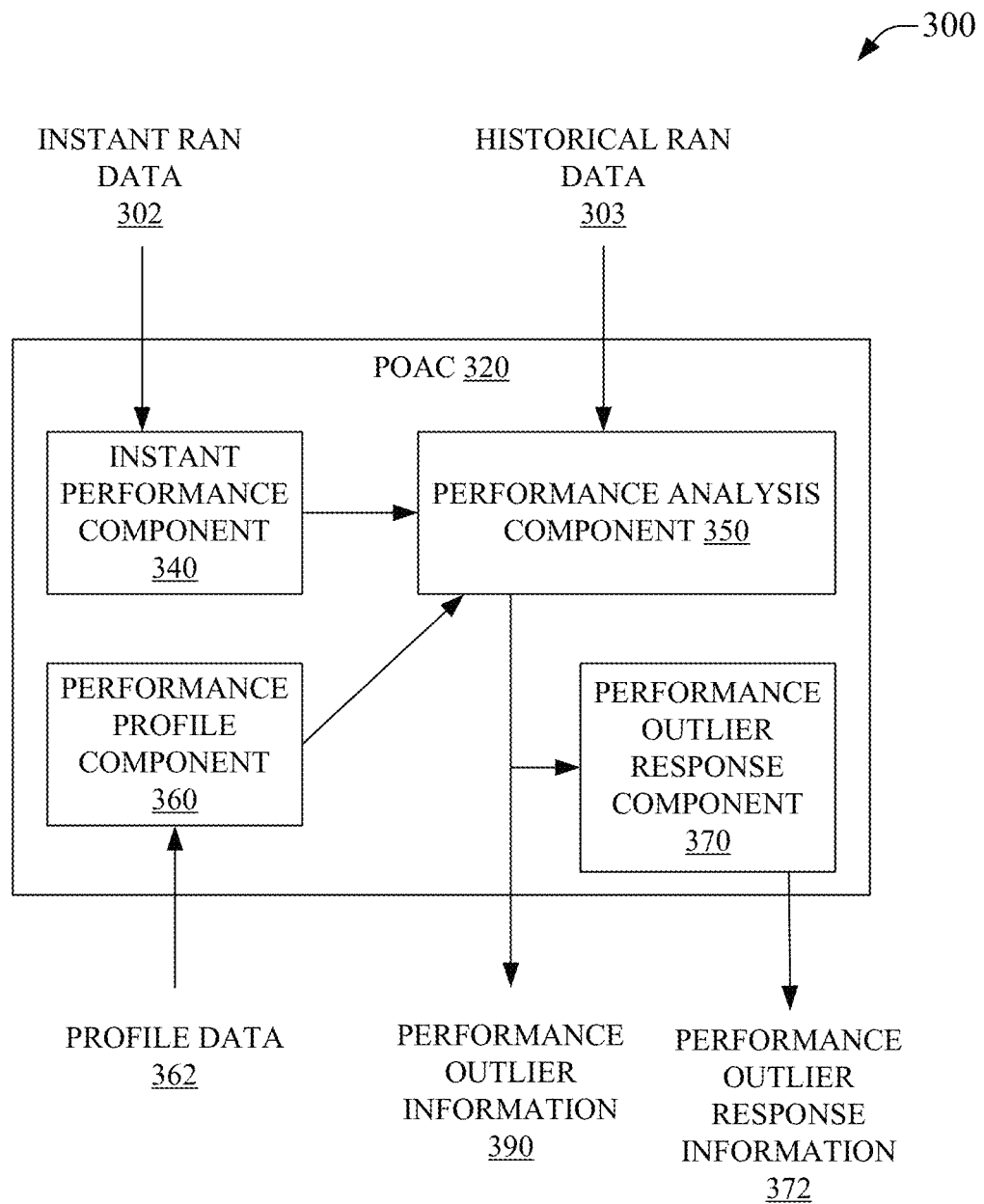
FIG. 3 illustrates an example system that facilitates access to performance outlier information based on performance outlier analysis of current and historical RAN information in accordance with aspects of the subject disclosure.

FIG. 3 illustrates a system 300 that facilitates access to performance outlier information based on performance outlier analysis of current and historical RAN information in accordance with aspects of the subject disclosure. System 300 can comprise POAC 320. POAC 320 can receive instant RAN data 302 and historical RAN data 303. Instant RAN data 302 can comprise current information related to a RAN device. In some embodiments, instant RAN data 302 can comprise KPIs related to operation of a RAN device. Historical RAN data 303 can comprise historic information related to a RAN device and, in some embodiments, can comprise historical KPIs. In an aspect, historical RAN data 303 can comprise some, none, or all, historical RAN data for one or more RAN devices related to outlier analysis in response to POAC 320 receiving instant RAN data 302. In some embodiments historical RAN data 303 can comprise historical information related to a RAN determined to be relevant to an outlier analysis by POAC 320. In certain embodiments POAC 320 can designate what historical RAN information is to be received as historical RAN data 303, e.g., POAC 320 can request historical RAN information of a determined depth, related to a RAN environment determined to be historically similar, etc., which can then be received, such as from a data store, as historical RAN data 303. In other embodiments, Historical RAN data 303 can be related to a RAN device related to the outlier analysis and POAC 320 can filter or process historical RAN data 303 to employ relevant data contained therein. Nearly any data associated with the operation of a RAN device or the environment and characteristics of the RAN device or associated network can be part of instant RAN data 302 and/or historical RAN data 303. Of note, historical RAN data 303 can be received from nearly any source, e.g., a RAN device can store its own historical information and provide access thereto when requested, historical RAN information can be compiled on carrier-side servers or other data stores, historical RAN information can be warehoused in third-party data stores, historical RAN information can be stored across one or more data stores communicatively coupled to POAC 320, etc.

POAC 320 can determine, based on instant RAN data 302 and historical RAN data 303, performance aspects of a RAN device or associated network, including information related to atypical or anomalistic behavior, e.g., a performance outlier. A performance outlier can be related to RAN device related values that are outside of a determined or specified normal operation parameter. In an aspect, a performance outlier can be directly identified from instant RAN data 302 where a value is determined to satisfy a rule related to the normal value ascribed to the associated performance parameter, e.g., wherein the normal value is determined without the use of historical RAN data 303, for example, a current drop in a power supply of a RAN device can be determined to be a performance outlier where the power supply is rated by the manufacturer to provide a specified minimum current, e.g., the current drop can be ascribed to a failing power supply without reliance on historical RAN data 303. In another aspect, a performance outlier can be determined based on analysis of Instant RAN data 302 and historical RAN data 303 to determine atypical behavior, e.g., an outlier analysis can determine outliers based on instant performance metrics in view of historical performance metrics, including historical performance metrics that can be considered highly relevant, e.g., historical performance metrics related to historically similar environments.

POAC 320 can comprise instant performance component 340 that can determine values for metrics of interest from instant RAN data 302 for current RAN operations. As an example, instant performance component 340 can determine a number of failed sessions, a total of session events, and compute a failure rate based thereon, from instant RAN data 302 being received from one or more RAN device. In an aspect, instant RAN data 302 can be a burst or continuous flow of data, e.g., a RAN device can send the last hour of performance data to POAC 320 in a short burst of data at one hour intervals, or can send data as it occurs to in a pseudo-continuous trickle of data that can be compiled at POAC 320. The example one last hour of data can be considered instant data in comparison of historical RAN data 303 that can be distinct in that it can reflect data for the same hour but for previous days and, more especially, for previously similar days, e.g., data collected that is from a historically similar environment for the RAN device.

Performance analysis component 350 of POAC 320 can receive instant performance information from instant performance component 340 and can receive historical RAN data 303. Performance analysis component 350 can determine performance outlier information 390 based on the information received from instant performance component 340 and historical RAN data 303. In an aspect, an outlier condition can indicate when the metric is determined to satisfy a rule related to a trigger value. The trigger value can be received from performance profile component 360 that can be updated via profile data 362. As an example, a rho value of 0.9 can be set via profile data 362 at performance profile component 360, which can be accessed by performance analysis component 350, such that when instant performance information and historical RAN data 303 result in a rho value of greater than 0.9, the related metric can be treated as indicating an outlier condition. This example outlier condition can then be responded to, e.g., being reported out as part of performance outlier information 390, etc.

Performance outlier response component 370 can receive performance outlier information 390 and can determine performance outlier response information 372. Performance outlier response information 372 can comprise information related to a response to a determined outlier condition. As examples, performance outlier response information 372 can comprise information initiating an alert, information adapted for use in a planning system such as carrier planning component 299, etc., information initiating a service visit, etc. In some embodiments, performance outlier response component 370 can be comprised in POAC 320 and can receive updates via performance profile component 360, not illustrated, based on profile data 362, e.g., profile data can indicate or designate both trigger values and/or processes for generating performance outlier response informing 372 based on performance outlier information 390. Of note, performance outlier information 390 can differ from performance outlier response information 372 in that the prior can indicate the outlier, the RAN, the value, the environment, etc., related to the determination of the outlier condition itself, while the later can indicate how to address the determined outlier condition, e.g., based on the particular outlier and value, should an alert be caused, should a crew be dispatched, can the condition be logged and tracked, etc.

As disclosed elsewhere herein, POAC 320 can be employed to automate outlier analysis for RAN devices. This can support scalable application of outlier analysis to a plurality of RAN devices. Moreover, POAC 320 can facilitate analysis of large amounts of data, such as can be received from a wireless access network at the carrier or enterprise level. In some embodiments, massive amounts of data can be quickly processed in an efficient manner by employing distributed computing paradigms, for example, on a Linux cluster with Spark data nodes. Where a massive data store can archive performance records for RAN devices comprising a wireless access network, POAC 320 can select relevant data therefrom, in view of instant RAN data 302 metrics determined by instant performance component 340. This historically similar environment information can be comprised in historical RAN dada 303 and can be analyzed in view of current RAN performance and an updateable profile for defining an outlier condition. Performance profile component 360 can allow for outlier definition profiles that set conditions, that can be the same or different, both for the same or different metrics on one or more RAN devices, e.g., an outlier can be defined as a change of more than 1% for dropped calls at a first RAN device and more than 1.25% for dropped calls at a second RAN device, while another outlier can be defined as a change of more than 100 session events/hour for both the first and second RAN device. Moreover, performance outlier response component 370 can respond to a determined outlier and provide access to information related to a determined response. The response can, in some embodiments, also be determined based on values in a profile, e.g., via performance profile component 360. Of note, more than one profile can be stored, allowing for rapid changes between profiles, e.g., a test profile, a normal operation profile, a malware response profile, etc., which can be manually or automatically selected, e.g., a test engineer can employ a test profile on demand, or a malware profile can automatically be selected when malware or another cyber attack is detected on the RAN, etc.

POAC 320 can facilitate access to performance outlier information 390. Performance outlier information 390 can comprise information related to analysis of Instant RAN data 302 and/or historical RAN data 303 via POAC 320. In some embodiments, performance outlier information 390 can comprise identification of a RAN device determined to have an outlying parameter or condition. As an example, performance outlier information 390 can comprise a list of RAN devices determined to have outlying operation values to aid in directing resources to correcting the outlying operation, e.g., repairs, upgrades, resets, etc. Performance outlier information 390 can comprise, in some embodiments, other information related to a RAN device, analysis of Instant RAN data 302, historical RAN data 303, etc. In a related embodiment, performance outlier information 390 can comprise information related to a historically similar environment for a RAN associated with an outlier value, identification of an event associated with evolution of an outlier value, an alert, a flag, a request for response, etc. Some, none, or all of this information can also be included in performance outlier response information 372. As an example, performance outlier response information 372 can include an alarm trigger, a determined outlier value, identification of the RAN device associated with the outlier value, and information indicating that a professional basketball game was in progress within the coverage area of the identified RAN device proximate in time to the determined outlier event. As such, performance outlier response information 372 can comprise instructions to cause logging of the outlier and monitoring of the condition with more restrictive outlier trigger values rather than containing instructions to dispatch a repair crew.

In an aspect, system 300 can enable outlier analysis to be performed in view of historical metrics associated with a RAN device and in view of an outlier detection profile and/or an outlier response profile. Of note, historical RAN data can be of nearly any depth, e.g., it may be none, some or all historical data for the RAN device being analyzed. Further of note, system 300 is scalable and outlier analysis can be performed as frequently as needed for a given computational budget, e.g., more frequent outlier analysis that can yield increasingly granular outlier detection. This can be accommodated by higher speed processors and/or distributed computing technologies. In an aspect, historical data can become stale and be of lesser value, however, the depth of historical data can be an engineering decision, e.g., which can be determined and included in a profile, e.g., via performance profile component 360, 460, etc. This can allow stale data to be excluded from a request related to accessing historical RAN data 303, filtered, or otherwise discounted. In some embodiments, older data can be weighted to have less effect, or conversely, newer data can be weighted to have more effect, in determining an outlier condition. Moreover, historical data of a certain age or determined lack of relevance can simply be discarded (or archived) from a data store, e.g., there is probably little sense in maintaining active historical RAN data storage for a RAN device that was replaced with a newer RAN device 15 years ago. As such, POAC 320 can access historical RAN data 303 from a catchall data store or can access data from a maintained data store that can be scrubbed and pruned to facilitate faster access to relevant data.

Figure 4:
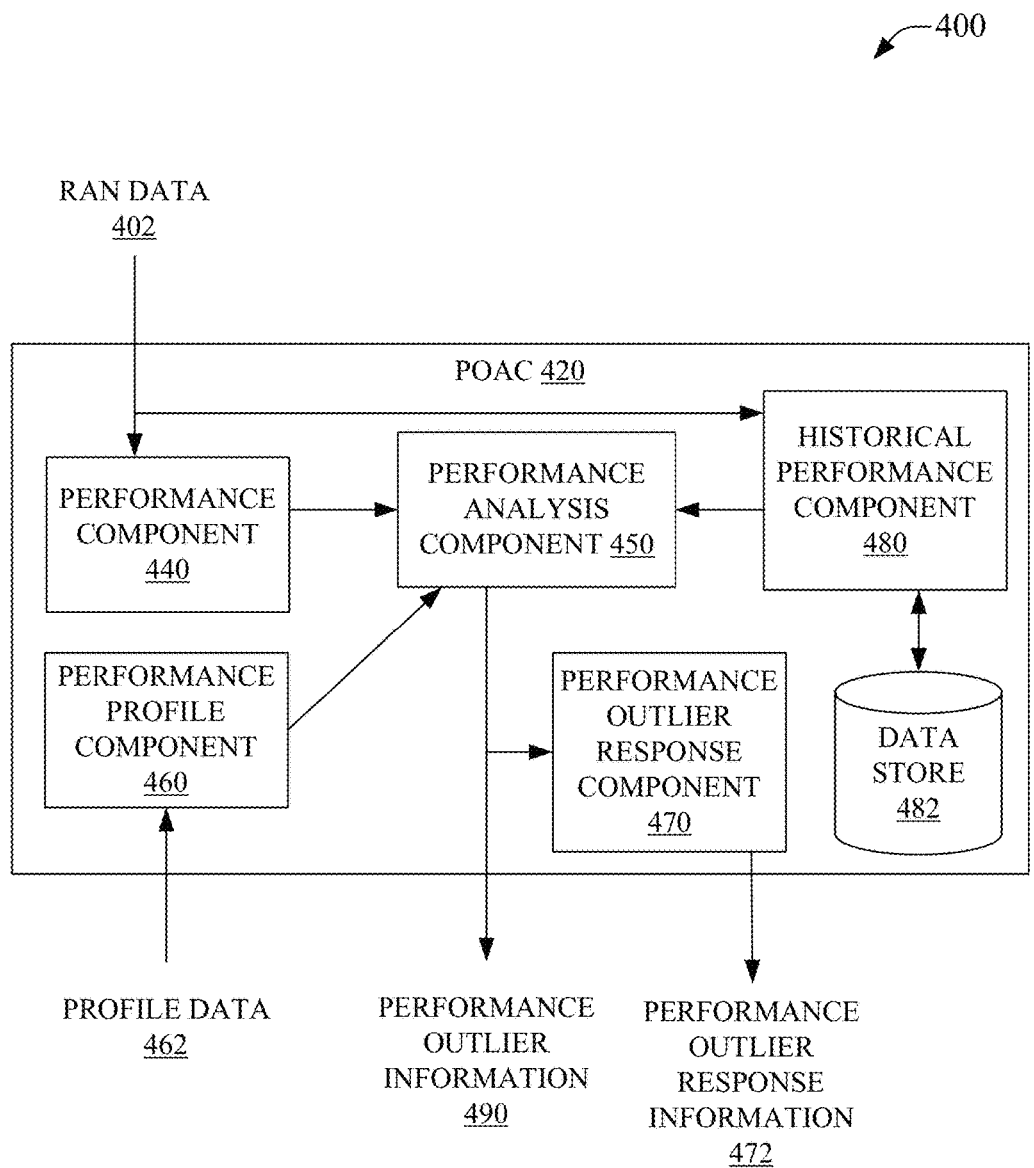
FIG. 4 illustrates an example system that facilitates access to performance outlier information based on performance outlier analysis of current RAN information and historical RAN information received from a data store in accordance with aspects of the subject disclosure.

FIG. 4 illustrates a system 400 that facilitates access to performance outlier information based on performance outlier analysis of current RAN information and historical RAN information received from a data store in accordance with aspects of the subject disclosure. System 400 can comprise a POAC 420. POAC 420 can receive instant RAN data 402. RAN data 402 can comprise current information related to a RAN device. In some embodiments, RAN data 402 can comprise KPIs related to operation of a RAN device. In an aspect, RAN data 402 can comprise historical RAN data related to a RAN device and, in some embodiments, can comprise historical KPIs. In an aspect, historical RAN data can comprise some, none, or all, historical RAN data for one or more RAN devices related to outlier analysis in response to POAC 420 receiving RAN data 402. In some embodiments, historical RAN data can comprise historical information related to a RAN determined to be relevant to an outlier analysis by POAC 420. Nearly any data associated with the operation of a RAN device or the environment and characteristics of the RAN device or associated network can be part of RAN data 402 and/or historical RAN data. Of note, historical RAN data can be received from nearly any source, e.g., a RAN device can store its own historical information and provide access thereto when requested, historical RAN information can be compiled on carrier-side servers or other data stores, historical RAN information can be warehoused in third-party data stores, historical RAN information can be stored across one or more data stores communicatively coupled to POAC 420, etc.

POAC 420 can comprise historical performance component 480 that can receive RAN data 402, including historical RAN data comprised therein. Historical performance component 480 that can facilitate filtering of historical RAN data from RAN data 402. In some embodiments, historical performance component 480 that can determine what historical RAN data is related to current performance, e.g., as determined by performance component 440, and facilitate accessing said relevant historical RAN data via RAN data 402, e.g., relevant historical RAN data can be related to a historical similar environment and historical performance component 480 that can facilitate designating that such data is included in RAN data 402 received by POAC 420. In certain embodiments POAC 420 can designate what historical RAN information is to be received as historical RAN data comprised in RAN data 402, e.g., POAC 420 can request historical RAN information of a determined depth, related to a RAN environment determined to be historically similar, etc., which can then be received, such as from a data store, as part of RAN data 402. In other embodiments, historical RAN data can be included in RAN data 402 and historical performance component 480 that can facilitate filtering RAN data 402 to employ historical RAN data that is deemed relevant, e.g., based on selecting historically similar environment RAN data from the included historical RAN data of RAN data 402. Historical performance component 480 that can further facilitate the storage of data via data store 482. In a further aspect, historical RAN data previously stored on data store 482 can be retrieved by historical performance component 480 as part of an outlier analysis of RAN data 402 by POAC 420, e.g., via performance analysis component 450.

POAC 420 can determine, based on RAN data 402 and historical RAN data, performance aspects of a RAN device or associated network, including information related to atypical or anomalistic behavior, e.g., a performance outlier. A performance outlier can be related to RAN device related values that are outside of a determined or specified normal operation parameter. In an aspect, a performance outlier can be directly identified from RAN data 402 where a value is determined to satisfy a rule related to the normal value ascribed to the associated performance parameter, e.g., wherein the normal value is determined without the use of historical RAN data. In another aspect, a performance outlier can be determined based on analysis of RAN data 402 and historical RAN data to determine atypical behavior, e.g., an outlier analysis can determine outliers based on instant performance metrics in view of historical performance metrics, including historical performance metrics that can be considered highly relevant, e.g., historical performance metrics related to historically similar environments.

POAC 420 can comprise performance component 440 that can determine values for metrics of interest from RAN data 402 for current RAN operations. As an example, performance component 440 can determine a number of failed sessions, a total of session events, and compute a failure rate based thereon, from RAN data 402 being received from one or more RAN device. In an aspect, RAN data 402 can be a burst or continuous flow of data. The example RAN data 402 related to a current/instant state of a RAN device can be considered instant data in comparison to historical RAN data that can be distinct because it reflects data for the same or similar RAN environments but for previous states/events/periods, e.g., a same 2-hour window for previous days and, more especially, for previously similar days, such as for the last twelve Tuesdays from 9 am to 11 am.

Performance analysis component 450 of POAC 420 can receive performance information from performance component 440 and can receive historical RAN data from historical performance component 480, e.g., extracted from RAN data 402 and/or retrieved from data store 482. Performance analysis component 450 can determine performance outlier information 490 based on the information received from performance component 440 and historical RAN data. In an aspect, an outlier condition can be indicated when a metric is determined to satisfy a rule related to a trigger value. The trigger value can be comprised in a profile accessible via performance profile component 460, and which profile can be updated with profile data 462. As an example, a rho value can be set in a first profile in accordance with profile data 462 via performance profile component 460, which can be accessed by performance analysis component 450, such that when performance information and historical RAN data result in a rho value of greater than the set value, the related metric can be designated as an outlier. This example outlier condition can then be responded to, e.g., being reported out as part of performance outlier information 490, etc.

Performance outlier response component 470 can receive performance outlier information 490 and can determine performance outlier response information 472. Performance outlier response information 472 can comprise information related to a response to a determined outlier condition. As examples, performance outlier response information 472 can comprise information initiating an alert, information adapted for use in a planning system such as carrier planning component 299, etc., information initiating a service visit, etc. In some embodiments, performance outlier response component 470 can be comprised in POAC 420 and can receive updates via performance profile component 460, update not illustrated for clarity, based on profile data 462, e.g., profile data can indicate or designate both trigger values and/or processes for generating performance outlier response information 472 based on performance outlier information 490. Of note, performance outlier information 490 can differ from performance outlier response information 472 in that the prior can indicate the outlier, the RAN, the value, the environment, etc., related to the determination of the outlier condition itself, while the later can indicate how to address the determined outlier condition, e.g., based on the particular outlier and value, should an alert be caused, should a crew be dispatched, can the condition be logged and tracked, etc.

As disclosed elsewhere herein, POAC 420 can be employed to automate outlier analysis for RAN devices. This can support scalable application of outlier analysis. Moreover, POAC 420 can facilitate analysis of large amounts of data, such as can be received from a wireless access network at the carrier or enterprise level. In some embodiments, massive amounts of data can be quickly processed in an efficient manner by employing distributed computing paradigms, for example, on a Linux cluster with Spark data nodes. Where a massive data store can archive performance records for RAN devices comprising a wireless access network, POAC 420 can select relevant data therefrom, in view of RAN data 402 metrics determined by performance component 440. This historically similar environment information can be comprised in RAN data, e.g., the historical data and the instant data can be comprised in RAN data 402, and can be analyzed in view of current RAN performance and an updateable profile for defining an outlier condition. Performance profile component 460 can allow for outlier definition profiles that set conditions, that can be the same or different, both for the same or different metrics on one or more RAN devices. Moreover, performance outlier response component 470 can respond to a determined outlier and provide access to information related to a determined response. The response can, in some embodiments, also be determined based on values in a profile, e.g., via performance profile component 460. Of note, more than one profile can be stored, allowing for rapid changes between profiles.

POAC 420 can facilitate access to performance outlier information 490. Performance outlier information 490 can comprise information related to analysis of RAN data 402 and/or historical RAN data via POAC 420. In some embodiments, performance outlier information 490 can comprise identification of a RAN device determined to have an outlying parameter or condition. As an example, performance outlier information 490 can comprise a list of RAN devices determined to have outlying operation values to aid in directing resources to correcting the outlying operation, e.g., repairs, upgrades, resets, etc. Performance outlier information 490 can comprise, in some embodiments, other information related to a RAN device, analysis of RAN data 402, historical RAN data, etc. In a related embodiment, performance outlier information 490 can comprise information related to a historically similar environment for a RAN associated with an outlier value, identification of an event associated with evolution of an outlier value, an alert, a flag, a request for response, etc. Some, none, or all of this information can also be included in performance outlier response information 472.

In an aspect, system 400 can enable outlier analysis to be performed in view of historical metrics associated with a RAN device and in view of an outlier detection profile and/or an outlier response profile. Of note, historical RAN data can be of nearly any depth, e.g., it may be none, some or all historical data for the RAN device being analyzed. Further, of note, system 400 can be scalable and outlier analysis can be performed as frequently as needed for a given computational budget. This can be accommodated by higher speed processors and/or distributed computing technologies. In an aspect, historical data can become stale and be of lesser value, however, the depth of historical data can be an engineering decision, e.g., which can be determined and included in an updateable profile, e.g., accessed via performance profile component 360, 460, etc. This can allow stale data to be excluded from a request related to accessing historical RAN data, filtered, or otherwise discounted. In some embodiments, older data can be weighted to have less effect, or conversely, newer data can be weighted to have more effect, in determining an outlier condition. Moreover, historical data of a certain age or determined lack of relevance can simply be discarded (or archived) from a data store. As such, POAC 420 can access historical RAN data from a catchall data store or can access data from a maintained data store that can be scrubbed and pruned to facilitate faster access to relevant data.

Figure 5:
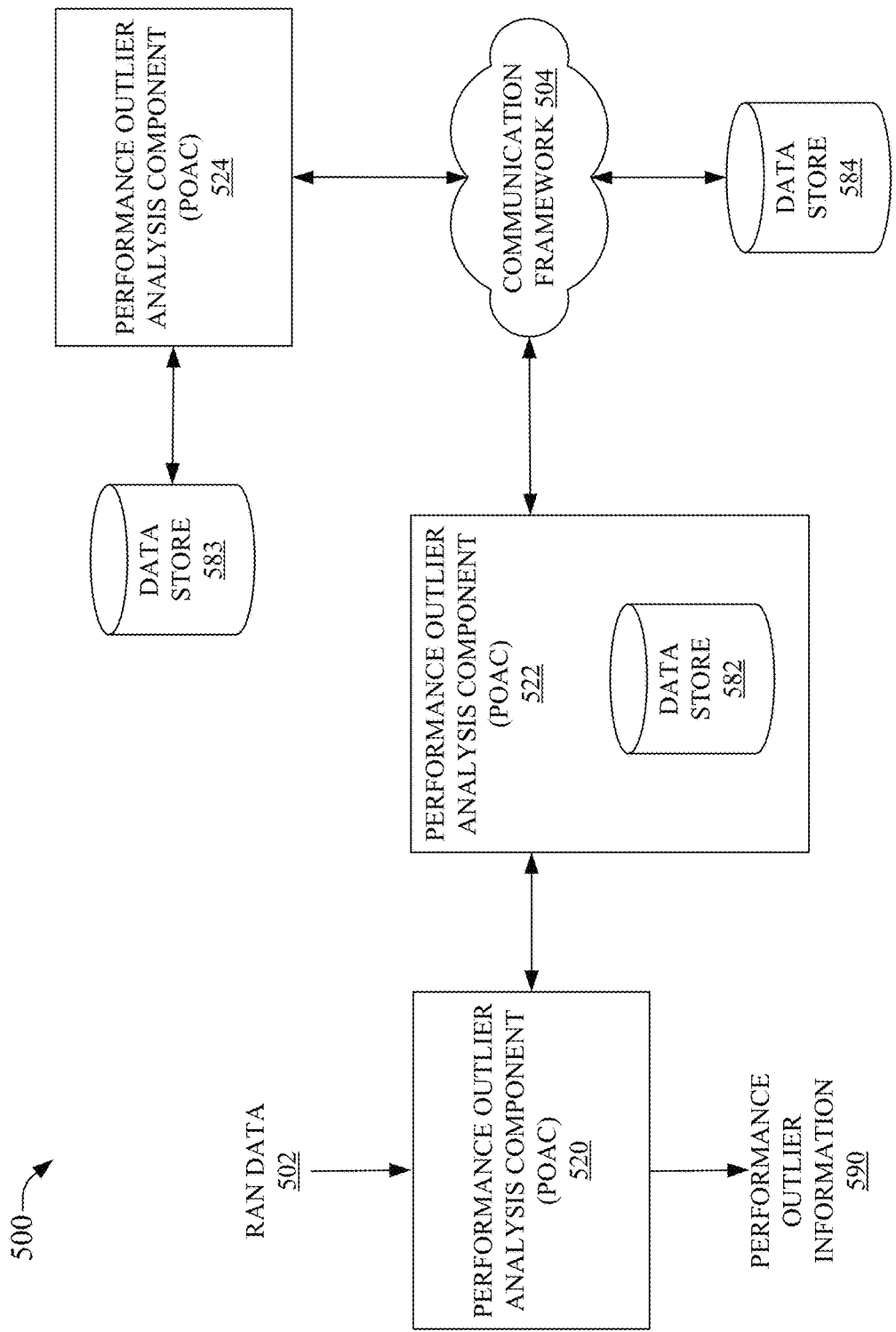
FIG. 5 illustrates an example system depicting enabling access to performance outlier information determined via a distributed computing environment in accordance with aspects of the subject disclosure.

FIG. 5 illustrates a system 500 that facilitates enabling access to performance outlier information determined via a distributed computing environment in accordance with aspects of the subject disclosure. System 500 can comprise POAC 520 that can receive RAN data 502 and enable access to performance outlier information 590. RAN data 502 can comprise current information related to a RAN device. In some embodiments, RAN data 502 can comprise KPIs related to operation of a RAN device. In an aspect, RAN data 502 can comprise historical RAN data related to a RAN device and, in some embodiments, can comprise historical KPIs. In an aspect, historical RAN data can comprise some, none, or all, historical RAN data for one or more RAN devices related to outlier analysis in response to POAC 520 receiving RAN data 502. In some embodiments, historical RAN data can comprise historical information related to a RAN determined to be relevant to an outlier analysis by POAC 520. Nearly any data associated with the operation of a RAN device or the environment and characteristics of the RAN device or associated network can be part of RAN data 502 and/or historical RAN data. Of note, historical RAN data can be received from nearly any source, e.g., a RAN device can store its own historical information and provide access thereto when requested, e.g., via data store 582, etc., historical RAN information can be compiled on carrier-side servers or other data stores, e.g., via data store 584, etc., historical RAN information can be warehoused in third-party data stores, e.g., via data store 583, etc., historical RAN information can be stored across one or more data stores communicatively coupled to POAC 520, etc.

POAC 520 can determine and facilitate access to performance aspects of a RAN device or associated network, including information related to atypical or anomalistic behavior, e.g., a performance outlier, based on RAN data 502, which can comprise historical RAN data, and historical RAN data access via other sources, e.g., data store 582-584, etc. Performance outlier information 590 can comprise information related to RAN device related values that are outside of a determined or specified normal operation parameter, e.g., a performance outlier. In an aspect, a performance outlier can be directly identified from RAN data 502 where a value is determined to satisfy a rule related to the normal value ascribed to the associated performance parameter, e.g., wherein the normal value is determined without the use of historical RAN data. In another aspect, a performance outlier can be determined based on analysis of RAN data 502 and historical RAN data to determine atypical behavior, e.g., an outlier analysis can determine outliers based on instant performance metrics in view of historical performance metrics, including historical performance metrics that can be considered highly relevant, e.g., historical performance metrics related to historically similar environments.

POAC 520 can be communicatively coupled to POAC 522 and/or POAC 524, etc., for example, as illustrated in system 500. Of note, other communicative coupling schema are within the scope of the instant disclosure, though are not recited for the sake of clarity and brevity. This can support scalable application of outlier analysis, e.g., via distributed computation, etc. POAC 520 can facilitate analysis of large amounts of data, such as can be received from a wireless access network at the carrier or enterprise level. In some embodiments, outlier analysis can be processed by employing distributed computing paradigms, for example, on a Linux cluster with Spark data nodes. Where one or more data stores, e.g., 582-584, etc., can archive performance records for one or more RAN devices, POAC 520 can select, or instruct other devices to select, relevant data therefrom, in view of RAN data 502. Historically similar environment information can be comprised in RAN data and can be analyzed in view of current RAN performance and a profile for defining an outlier condition. POAC 520 can delegate outlier analysis tasks, e.g., computation, data retrieval/filtering, etc., to other device, e.g., POAC 522, 524, etc., to allow for outlier determination to be processed across one or more devices, e.g., distribution of outlier analysis across POAC 520-524, etc., based on RAN data 502 and enabling access to performance outlier information 590. As an example, POAC 520 can be a single device capable of processing data for only a few RAN devices, POAC 522 can be a Linux cluster that can process data for several hundred RAN devices, and POAC 524 can be a virtualized POAC that can run on many clustered computing devices to process data for an unlimited number of RAN devices. In this example, it can be cost efficient for a single user to operate POAC 520, but operation of 522 and 524 can be overly resource intensive to be practicable. Further, in this example, POAC 522 can be employed by a regional carrier entity for normal operations, while 524 remains prohibitively resource intensive. Still further in this example, POAC 524 can be operated by a third party vendor servicing several regional carrier entities, can be operated by a national carrier entity, etc. Where outlier detection at a granularity that exceeds POAC 520 capabilities, operations can be shared/distributed to POAC 522 and/or 524. Similarly, where outlier detection exceeds POAC 522 capabilities, operations can be shared/distributed to POAC 524. As an example, where a regional carrier acquires another regional carrier, outlier analysis for the increased number of RAN devices in the expanded coverage can be accommodated by distributing operations to additional POAC, e.g., 524, etc., by reducing granularity of the analyses, selecting an alternate analysis scheme, analyzing outlier information for less than all of the RAN devices, etc. The scalable nature of the present disclosure allows for ready adaptation of POAC devices, e.g., 520-524, to accommodate a fluctuating number of RAN devices, changes in desired granularity of data, changes in accuracy of outlier data, etc.

In an aspect, a POAC, e.g., 582, can comprise a data store, e.g., 582, that can enable storage of historic RAN data at the POAC. In some embodiments, data store 582 can store some, all, or no data related to RAN devices being analyzed by POAC 522, e.g., storing data locally can allow ready access to relevant data, e.g., historically similar environment data is already stored locally in this scenario. In other embodiments, data store 582 can store filtered data, e.g., bulk data is stored elsewhere, e.g., data store 584, etc., and relevant historic RAN data can be stored locally, e.g., at data store 582, etc.

In another aspect, a POAC, e.g., 584, can be communicatively coupled to a data store, e.g., 583, that can enable storage of historic RAN data proximate to the POAC, though not necessarily as part of the POAC. In some embodiments, data store 583 can store some, all, or no data related to RAN devices being analyzed by POAC 524, e.g., storing data locally can allow ready access to relevant data, e.g., historically similar environment data is already stored near to the POAC in this scenario. In other embodiments, data store 583 can store filtered data, e.g., bulk data is stored elsewhere, e.g., data store 584, etc., and relevant historic RAN data is stored proximate to the POAC, e.g., data store 583, etc.

In a further aspect, data stored on data store(s) 582-584, etc., can be accessible to one or more of the POAC(s) 520-524, etc., to facilitate outlier analysis. As an example, data store 584, accessed by POAC 520 via communication framework 504, can store archival historic RAN data, data store 582, accessed by POAC 520 via POAC 522, can store all data for RANs connected to POAC 520 for the last 6 months. This can allow POAC 520 to perform outlier analysis quickly for local RAN devices, a little more slowly for RAN devices needing data from data store 583 and a little more slowly for archival data on data store 584. In another example, data store 584 can receive and store all RAN data from each of POAC 520-524 as RAN data is determined and this data can then be accessed by each of POAC 520-524 in determining outlier information, noting that POAC 520 (without local storage) moves all data for the analysis across the network in real time, POAC 522 with internal storage (582) can cache data for outlier analysis and can access other data via data store 584 as needed, and POAC 524 can cache presumably more data on local external storage (583) data for most outlier analysis and presumably request supplemental data from data store 584 the least. This example illustrates low hardware cost (520) with high data burdens, moderate hardware cost (522/582) with moderate bandwidth burdens, and high hardware cost (524/583) with low bandwidth needs. It will be noted that these examples are not exhaustive and nay and all other configurations of distributed computing and data storage/transfer are within the scope of the instant disclosure though not explicitly recited for the sake of clarity and brevity.

Figure 6:
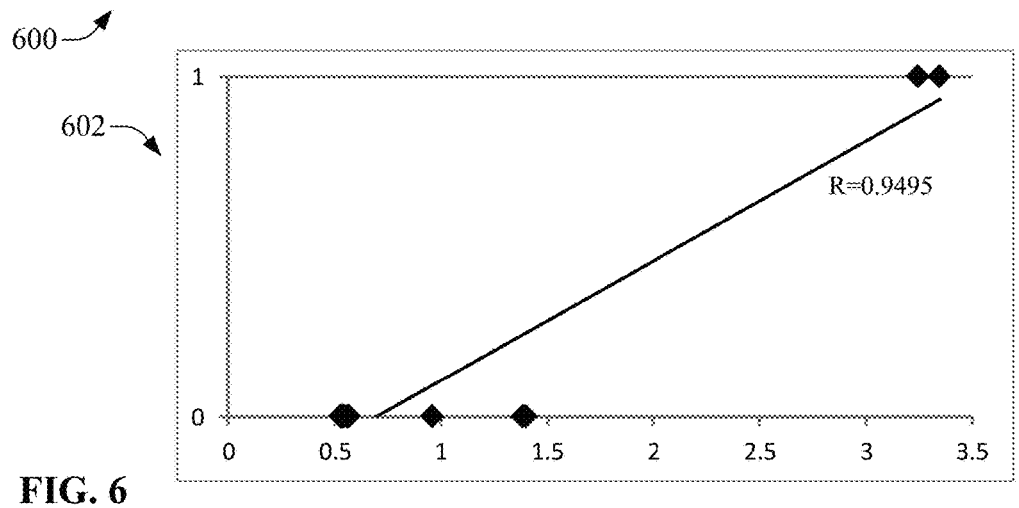
FIG. 6 illustrates example RAN performance data, an example binary array, example determined performance outlier information, and an example data plot corresponding related thereto, in accordance with aspects of the subject disclosure.

FIG. 6 is a depiction 600 of example RAN performance data, an example binary array, example determined performance outlier information, and an example data plot corresponding related thereto, in accordance with aspects of the subject disclosure in accordance with aspects of the subject disclosure. Table 600 can comprise KPI values corresponding to 13 KPI environments, e.g., columns KPI-1 through KPI-13, for a RAN device metric. Of note, the example KPI values illustrated in FIG. 6, can be percentages of failures measured, e.g., KPI (%), so as to correspond to the values determined in example FIG. 7, however, KPIs can be other than a percentage in both FIGS. 6 and 7 without departing from the disclosed subject matter, although not discussed for the sake of clarity and brevity. A KPI environment can denote, for example, a date, wherein KPI-13 can be a call drop rate for today from noon to 1 pm, KPI-12 can be a call drop rate for one week earlier from noon-1 pm, KPI-11 can be for the same time window the week before that, etc., such that the same time window on the same day of the week is used in the analysis, e.g., a historically similar environment for the RAN device. In another example, KPI-13 can be calls dropped during today's home football game, KPI-12 can be for calls dropped during the last home football game, KPI-11 can be for the home game before that, etc., indicating that the environment can be historically similar even though the time is not periodic in nature. Table 600 can further comprise 24 rows of binary array data as illustrated.

Of note, other numbers of KPI environments illustrate is 13, e.g., 12 historic plus one instant/current KPI value are represented in row KPI, columns KPI-1 through KPI-13. However, the present disclosure is not so limited and any number of KPI environments can be employed, e.g., 1 column, 4 columns, 7 columns, 67 columns, 109 columns, 1.5M columns, etc. Moreover, the binary array portion of Table 600 illustrates a stair step pattern, however the disclosure is again not limited to this pattern, and all binary array patterns are within the scope of this instant disclosure. The number of rows can be dependent on the number of KPI environments, e.g., columns, employed. Table 600 displays 24 rows of binary array for completeness, though fewer rows can be employed where the correlation coefficients becomes duplicative, or can be greater where the set of correlation coefficients can be incomplete.

Table 600, in the far right column, illustrates a computed correlation coefficient based on the tabulated values illustrated. Of note, the correlation coefficient can be determined from the Pearson Product Moment Correlation, though other correlation coefficients can be readily used without departing from the scope of the instant disclosure, though not explicitly discussed herein for the sake of clarity and brevity. In accord with Pearson Product Moment Correlation, there is a stronger correlation where rho approaches +/−1, and less correlation as rho approaches 0. This correlation can be readily appreciated by plotting the values for a row of tabulated data and determining a linear trend line for the plotted data, as depicted at 602 for Row 11 of the tabulated data in table 600. Plot 602 illustrates a comparatively strong correlation, rho=0.9495, in comparison to most of the other rho values in table 600, indicating a strong correlation between KPI-12 and KPI-13, and less correlation to KPI-1 through KPI-11. For the data in table 600, assuming a trigger value of rho>0.9, then row 11 indicates that environments KPI-12 and KPI-13 correspond to outlier events. This can indicate that the metrics from those two RAN device environments can be related to an issue with the RAN device that may need to be addressed. Further, this correlation can allow for computation of additional information, e.g., that can also be included in performance outlier information 190-590, etc., as will be discussed in relation to the following Figure.

FIG. 7 is a depiction 700 of example RAN performance data corresponding to an example performance outlier condition, and additional example performance outlier information than can be determined in accordance with aspects of the subject disclosure. Table 700 illustrates an example calculation of addition data that can be comprised in performance outlier information 190-590, etc. From table 600, the row with the highest correlation coefficient can be selected, e.g., row 11, as the 01 Pattern row in table 700. The KPI values from table 600 can be inserted as row KPI in table 700. Where, in this example, the KPI values are derived from a failure rate and an event rate, e.g., dropped call to placed calls, failed handovers to attempted handovers, etc., this additional information can be included in rows Failures and Events of table 700.

Taking note of the 01 Pattern row, KPI values for the KPI environments, e.g., KPI-1 through KPI-13 in this example, corresponding to the '0 values' can be considered uncorrelated and those corresponding to the '1 values' can be considered as correlated. The uncorrelated values can be considered 'normal' behavior for the RAN based on the historically similar environments, while the correlated values can be considered 'outliers'. As such, a baseline KPI value can be determined for the RAN device from the 'normal behavior, e.g., the sum of the failures can be divided by the sum of the events for the normal environment columns, e.g., the '0 value' columns. This gives a baseline failure rate of 0.74% in view of normal behavior of the RAN device, as determined from the historically similar environments. The baseline failure rate can then be multiplied with the events value of KPI-13 (and similarly with KPI-12, though not illustrated for clarity) to yield baseline failures for the RAN device at KPI-13, e.g., this is the number of failures attributable to the normal operation of the RAN device, in this example 7.73 of the 35 failures would be considered normal/baseline. The baseline failures can then be subtracted from the failures of KPI-13 to yield the additional failures observed above the baseline rate, e.g., the extra failure value, in this example, 27.27 of the 35 failures for the RAN device at KPI-13 are outliers above the normal 7.73 failures attributable to normal operation of the RAN device. Similar determinations can be made for the RAN device at other KPIs, though not illustrated, yielding a corresponding baseline failures value, and a corresponding extra failure value. Of note, when corresponding values for other KPIs are calculated, the count of previous KPIs selected via the binary matrix illustrated can preferably be based on the same or similar number of events, e.g., where, in the above example, a row is selected based on the highest correlation coefficient using 13 KPI values (KPI-1 to KPI-13 to select row 11 based on the correlation coefficient) and the baseline KPI value is determined from 11 of the 13 KPI values (KPI-1 to KPI-11), then calculations of the extra failure value for other KPIs can be based on a similar 13 KPIs, such as where the extra failure value for KPI-14 (not illustrated) is determined, it can be based on values selected from KPI-2 to KPI-13 based on the binary matrix and the resulting correlation coefficients. In an aspect, this can allow the disclosed subject matter to capture historical effects that would not be propagated in more conventional statistical techniques, e.g., 3-sigma, standard deviation, etc. Where another '01 pattern' was associated with the highest correlation coefficient, the '01 pattern' used to select normal KPI values used in computing the baseline KPI value can be different, which can result in a different baseline KPI value, baseline failure value, and a extra failure value. It will be noted that other values can be determined without departing from the scope of the present disclosure, though they are not discussed for the sake of clarity and brevity. As an example, RAN sites that have an extra failure value transitioning a minimum extra failure value can be flagged as acute offending RAN devices, etc.

Figure 8:
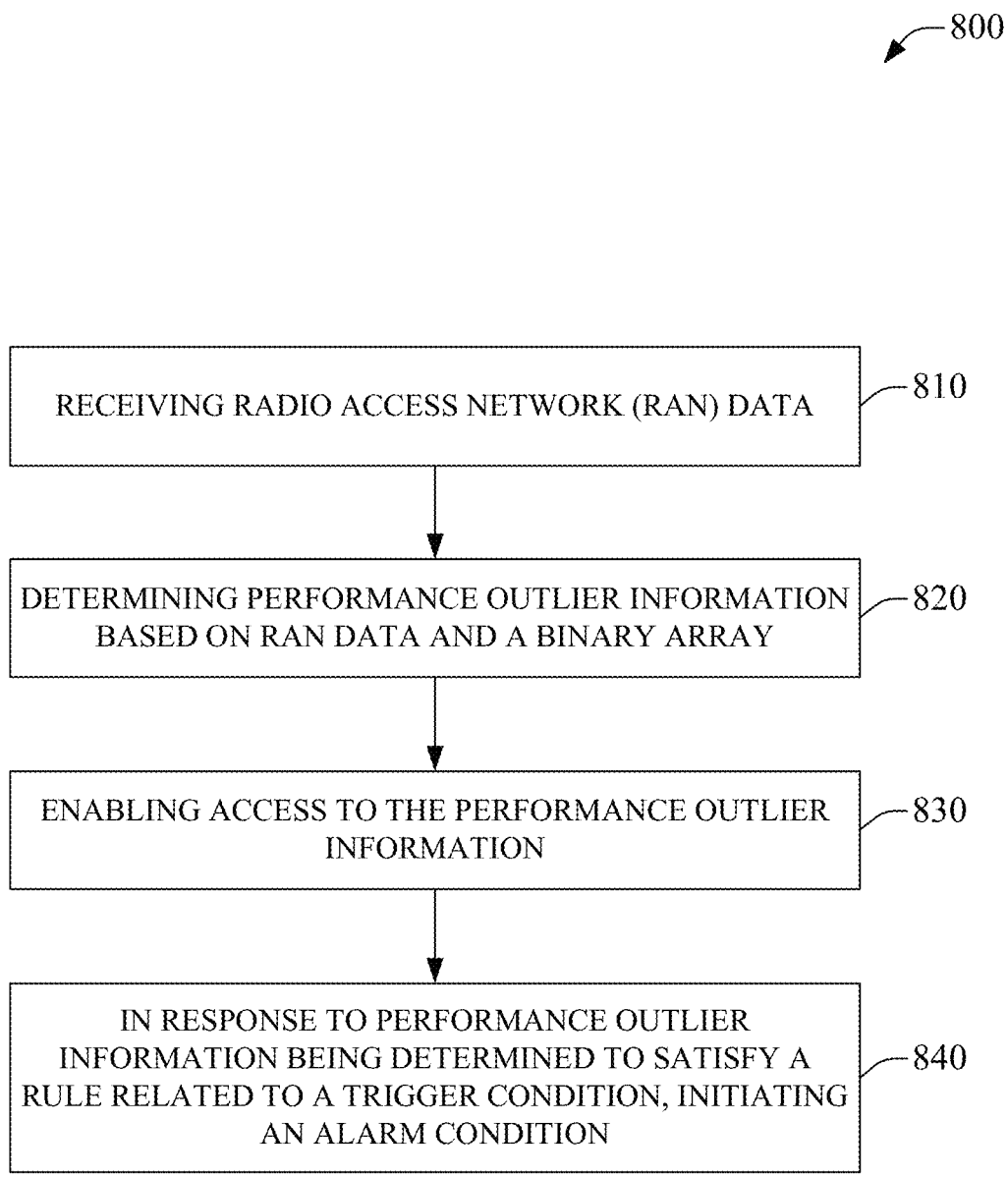
FIG. 8 illustrates an example method facilitating initiating an alert based on performance outlier analysis in accordance with aspects of the subject disclosure.
Figure 9:
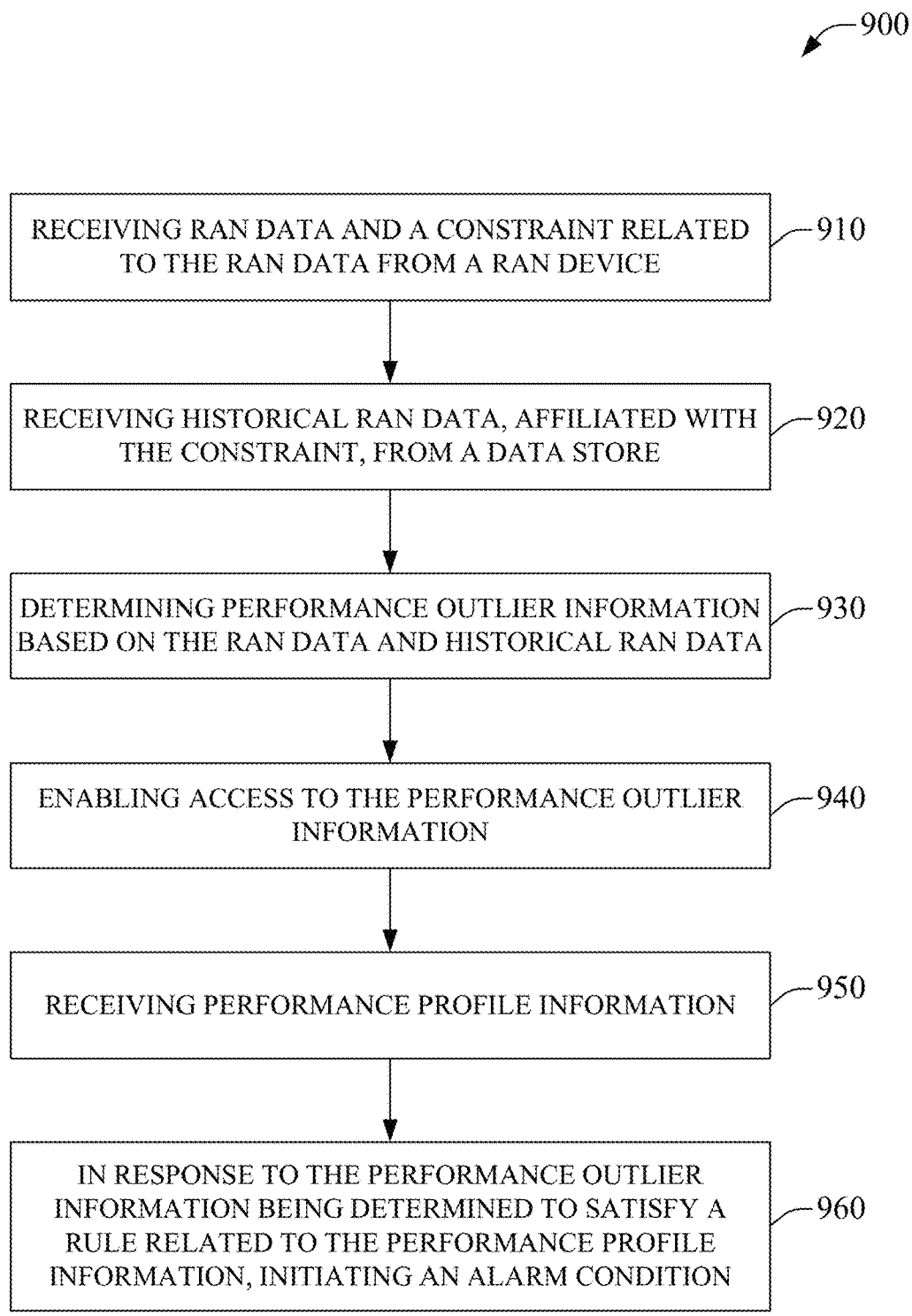
FIG. 9 depicts an example method facilitating determining performance outlier information based on performance outlier analysis of current and historical RAN information in accordance with aspects of the subject disclosure.
Figure 10:
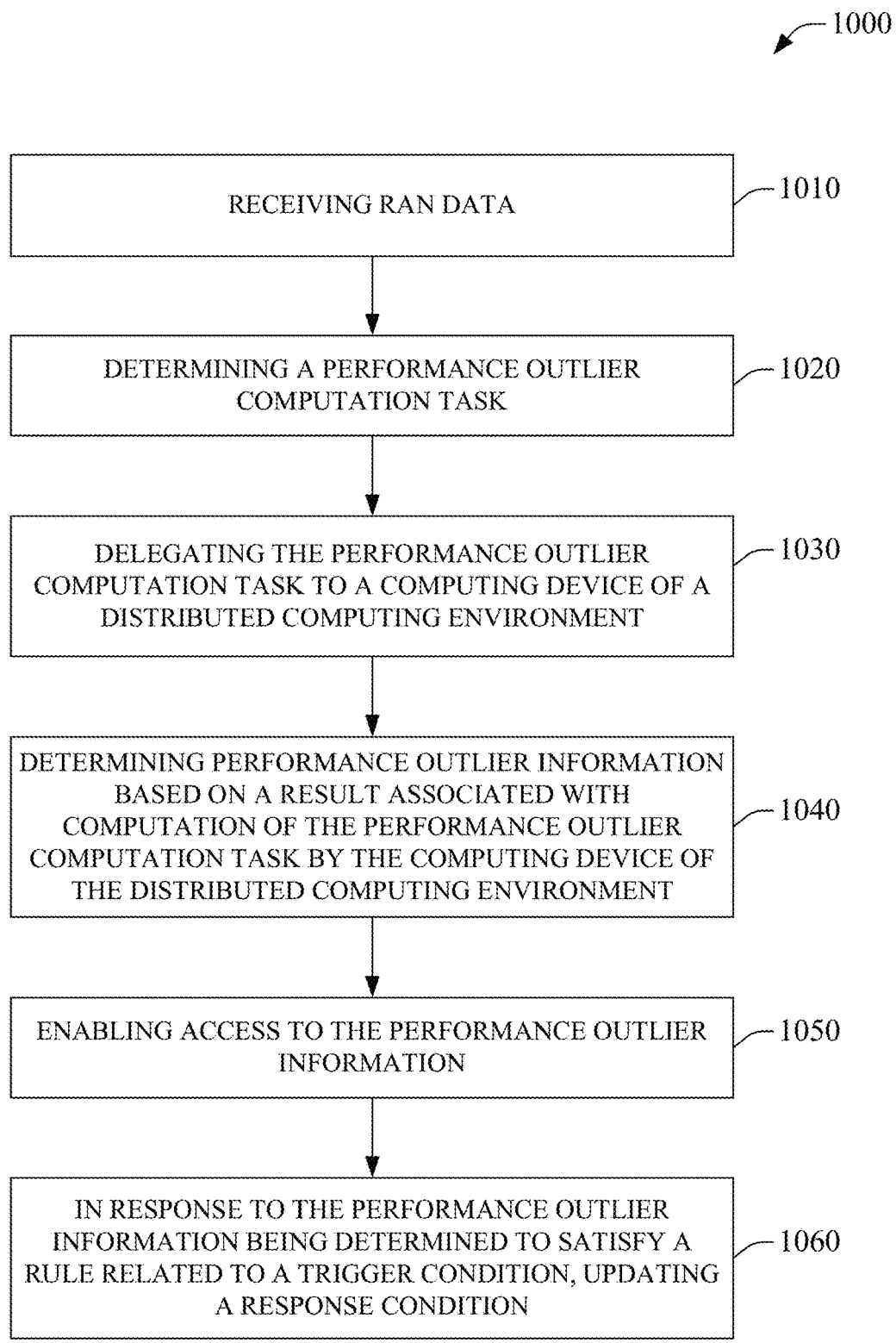
FIG. 10 illustrates an example method facilitating determining performance outlier information via a distributed computing environment in accordance with aspects of the subject disclosure.

In view of the example system(s) described above, example method(s) that can be implemented in accordance with the disclosed subject matter can be better appreciated with reference to flowcharts in FIG. 8-FIG. 10. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 8 illustrates a method 800 that facilitates initiating an alert based on performance outlier analysis in accordance with aspects of the subject disclosure. At 810, method 800 can comprise receiving radio access network (RAN) data. RAN data can comprise current information related to a RAN device. RAN data can further comprise historic information related to a RAN device. In some embodiments, RAN data can comprise key performance indicators (KPIs) related to operation of a RAN device. As examples, RAN data can comprise information related to events such as establishing and/or maintaining a call/data session, handoffs, dropped calls/data sessions, reestablished calls/data sessions, throughput, jitter, bandwidth, device identification, RAN device environment, e.g., time, date, weather, events, network traffic, vehicular or pedestrian traffic, software versions, operational uptime, repair information, hardware characteristics including temperature, versions, voltage, current, power, etc., position, rankings, self-organizing network information, network routing information, etc. Nearly any data associated with the operation of a RAN device or the environment and characteristics of the RAN device or associated network can be part of RAN data and can be current or historical in nature.

At 820, method 800 can comprise determining performance outlier information based on RAN data. This determination can be facilitated by analysis with a binary array, for example, as depicted in table 600. Performance outlier information can comprise information related to performance aspects of a RAN device or associated network, including information related to atypical or anomalistic behavior, e.g., a performance outlier. A performance outlier can be related to RAN device related values that are outside of a determined or specified normal operation parameter. In an aspect, a performance outlier can be directly identified where a value is determined to satisfy a rule related to the normal value ascribed to the associated performance parameter. In another aspect, a performance outlier can be determined based on analysis of RAN data to determine atypical behavior. This analytical aspect can be expanded to determine outliers based on historical performance. In an aspect, the instant disclosure can enable determination of normal behavior for a RAN device with regard to historically similar environments.

Method 800 can include, at 830, enabling access to the performance outlier information. Performance outlier information can be employed by other devices or methods to respond to, track, log, etc., a performance outlier for a RAN device. In an aspect, this can facilitate correction or mitigation of an underperforming RAN device. In another aspect, this can enable reporting of improvements related to alterations to a RAN or RAN device, e.g., where a software patch is rolled out to a RAN, an improvement in performance can be tracked where the RAN devices improve performance over normal performance after they are patched. In a further aspect, access to performance outlier information can facilitate planning for entities associated with a RAN, for example, tracking a semiannual KPI for RAN devices comprising a RAN can allow a network operator to determine that how quickly RAN devices are aging out based on how frequently performance outliers arise, thereby allowing the network operator to plan and budget for replacement of RAN devices at a future time.

At 840, method 800 can comprise initiating an alarm condition. At this point method 800 can end. The initiating the alarm condition can be in response to performance outlier information being determined to satisfy a rule related to a trigger condition. As an example, where performance outlier analysis indicates a measured level of dropped sessions exceeds a threshold value that is a multiple of a normal level of dropped sessions, an alarm can be triggered. As another example, where a RAN device is determined to have multiple consecutive outlier values for the same metric and the count satisfies a rule related to a trigger value, an alert can be sent to a repair department to facilitate sending a technician to address the issue at the RAN device.

In an aspect, method 800 can be performed on a computing device or across multiple computing devices, e.g., a distributed computing system. This can allow method 800 to effectively process related data in a timely and cost effective manner. Of note, this also allows method 800 to scale, e.g., more computing tasks can be added to address more RAN devices, deeper historical data, more metrics, finer granularity of outlier detection, etc., fewer computing tasks can be performed to reduce costs, free up computer equipment, etc., where less granular detection is acceptable, fewer RAN devices are monitored, more shallow historical data is employed, etc. As an example, method 800 can be performed on an Apache™ Spark™ platform with cluster computing to allow for spreading jobs across multiple data nodes in the cluster with data redundancy, scalability, and in-memory processing with typically low-cost hardware and open source software. With sufficient scaling, the present disclosure can allow for near real-time detection of performance outliers, acute offender RAN devices, etc.

FIG. 9 illustrates a method 900 that facilitates determining performance outlier information based on performance outlier analysis of current and historical RAN information in accordance with aspects of the subject disclosure. At 910, method 900 can comprise receiving RAN data and a constraint related to the RAN data from a RAN device. RAN data can comprise current information related to a RAN device. In some embodiments, RAN data can comprise KPIs related to operation of a RAN device. Nearly any data associated with the operation of a RAN device or the environment and characteristics of the RAN device or associated network can be part of RAN data and can be current or historical in nature.

The constraint can be related to operating environment of the RAN device. The constraint can enable selection of historically similar environment metrics. As an example, the constraint can be a RAN identifier, a time, a date, identification of an event, a location or proximity, traffic conditions proximate, geological information or weather conditions, solar activity information, etc. Nearly any data helping to identify the conditions, e.g., environment of the RAN device, in which the values for analysis are captured can facilitate effective selection of other data captured in a historically similar environment that can increase the relevance of the other data to the analysis of the instant data for outlier determination.

At 920, method 900 can comprise receiving historical RAN data. This historical RAN data can be affiliated with the constraint and can be received from a data store. The data store can be located proximate to or remote from a processor executing elements of method 900, as disclosed elsewhere herein. Historical RAN data can comprise historic information related to a RAN device and, in some embodiments, can comprise historical KPIs. In an aspect, historical RAN data can comprise some, none, or all, historical RAN data for one or more RAN devices related to outlier analysis in response receiving RAN data at 910. In some embodiments, historical RAN data can comprise historical information related to a RAN determined to be relevant to an outlier analysis. Of note, historical RAN data can be received from nearly any source, e.g., a RAN device can store its own historical information and provide access thereto when requested, historical RAN information can be compiled on carrier-side servers or other data stores, historical RAN information can be warehoused in third-party data stores, historical RAN information can be stored across one or more data stores communicatively coupled to a device executing method 900. Historically relevant data can be determined based, at least in part, on the constraint received at 910.

At 930, method 900 can comprise, determining performance outlier information based on the RAN data and the historical RAN data. This determination can, in some embodiments, be facilitated by analysis with a binary array, for example, as depicted in table 600. Performance outlier information can comprise information related to performance aspects of a RAN device or associated network, including information related to atypical or anomalistic behavior, e.g., a performance outlier. A performance outlier can be related to RAN device related values that are outside of a determined or specified normal operation parameter. In an aspect, a performance outlier can be directly identified where a value is determined to satisfy a rule related to the normal value ascribed to the associated performance parameter. In another aspect, a performance outlier can be determined based on analysis of RAN data to determine atypical behavior. This analytical aspect can be expanded to determine outliers based on historical performance. In an aspect, the instant disclosure can enable determination of normal behavior for a RAN device with regard to historically similar environments.

Method 900 can include, at 940, enabling access to the performance outlier information. Performance outlier information can be employed by other devices or methods to respond to, track, log, etc., a performance outlier for a RAN device. In an aspect, this can facilitate correction or mitigation of an underperforming RAN device. In another aspect, this can enable reporting of improvements related to alterations to a RAN or RAN device. In a further aspect, access to performance outlier information can facilitate planning for entities associated with a RAN.

At 950, method 900 can comprise receiving performance profile information. Performance profile information can comprise information related to a performance profile and can allow for outlier definition profiles that set conditions, that can be the same or different, both for the same or different metrics on one or more RAN devices, e.g., an outlier can be defined for a first RAN device and a different value can be defined for a second RAN device, while another outlier can be defined as a change in a value for both the first and second RAN device. Of note, more than one profile can be received, allowing for rapid changes between profiles, e.g., a test profile, a normal operation profile, a malware response profile, etc.

At 960, method 900 can comprise initiating an alert condition. At this point method 900 can end. The initiating the alert condition can be in response to performance outlier information being determined to satisfy a rule related to the performance profile information. As an example, where performance outlier analysis indicates a measured level of active data sessions satisfies a rule related to a corresponding value comprised in the performance profile information, an alarm can be triggered.

In an aspect, method 900 can be performed on a computing device or across multiple computing devices, e.g., a distributed computing system. This can allow method 900 to effectively process related data in a timely and cost effective manner. Of note, this also allows method 900 to scale. With sufficient scaling, the present disclosure can allow for near real-time detection of performance outliers, acute offender RAN devices, etc.

FIG. 10 illustrates a method 1000 that facilitates determining performance outlier information via a distributed computing environment in accordance with aspects of the subject disclosure. At 1010, method 1000 can comprise receiving RAN data. RAN data can comprise current and/or historical information related to a RAN device. In some embodiments, RAN data can comprise KPIs related to operation of a RAN device. Historical RAN data can comprise historic information related to a RAN device and, in some embodiments, can comprise historical KPIs. In an aspect, historical RAN data can comprise some, none, or all, historical RAN data for one or more RAN devices related to outlier analysis to be performed. In some embodiments, historical RAN data can comprise historical information related to a RAN determined to be relevant to an outlier analysis. Of note, historical RAN data can be received from nearly any source, e.g., a RAN device can store its own historical information and provide access thereto when requested, historical RAN information can be compiled on carrier-side servers or other data stores, historical RAN information can be warehoused in third-party data stores, historical RAN information can be stored across one or more data stores communicatively coupled to a device executing method 1000. Nearly any data associated with the operation of a RAN device or the environment and characteristics of the RAN device or associated network can be part of RAN data and can be current or historical in nature.

At 1020, method 1000 can comprise determining a performance outlier computation task. The performance outlier computation task can correspond to a portion of an outlier analysis that can be processed in a distributed computing environment. In an aspect, a plurality of performance outlier computation tasks can be executed in a manner that results in determining an outlier condition based on the RAN data received at 1010. At 1030, method 1000 can comprise, delegating the performance outlier computation task to a computing device of a distributed computing environment. This can allow method 1000 to effectively process related data in a timely and cost effective manner. Of note, this also allows method 1000 to scale. With sufficient scaling, the present disclosure can allow for near real-time detection of performance outliers, acute offender RAN devices, etc.

At 1040, method 1000 can comprise, determining performance outlier information based on a result associated with computation of the performance outlier computation task by the computing device of the distributed competent environment. In an aspect, one or more computing device, e.g., in a distributed computing environment, can each process one or more performance outlier computation task(s), such as a remotely located computing device receiving the computing task, collecting relevant historical RAN data, and determining a value that can be returned as a result of the computation on the RAN data and the historical RAN data. At 1040, the returned values from the distributed computations can be used to determine performance outlier information. Performance outlier information can comprise information related to performance aspects of a RAN device or associated network, including information related to atypical or anomalistic behavior, e.g., a performance outlier. A performance outlier can be related to RAN device related values that are outside of a determined or specified normal operation parameter. In an aspect, the instant disclosure can enable determination of normal behavior for a RAN device with regard to historically similar environments.

Method 1000 can include, at 1050, enabling access to the performance outlier information. Performance outlier information can be employed by other devices or methods to respond to, track, log, etc., a performance outlier for a RAN device. In an aspect, this can facilitate correction or mitigation of an underperforming RAN device. In another aspect, this can enable reporting of improvements related to alterations to a RAN or RAN device. In a further aspect, access to performance outlier information can facilitate planning for entities associated with a RAN.

At 1060, method 1000 can comprise updating a response condition. At this point method 1000 can end. The updating the response condition can be in response to performance outlier information being determined to satisfy a rule related to a trigger condition, such as can be accessed from a performance profile.

Figure 11:
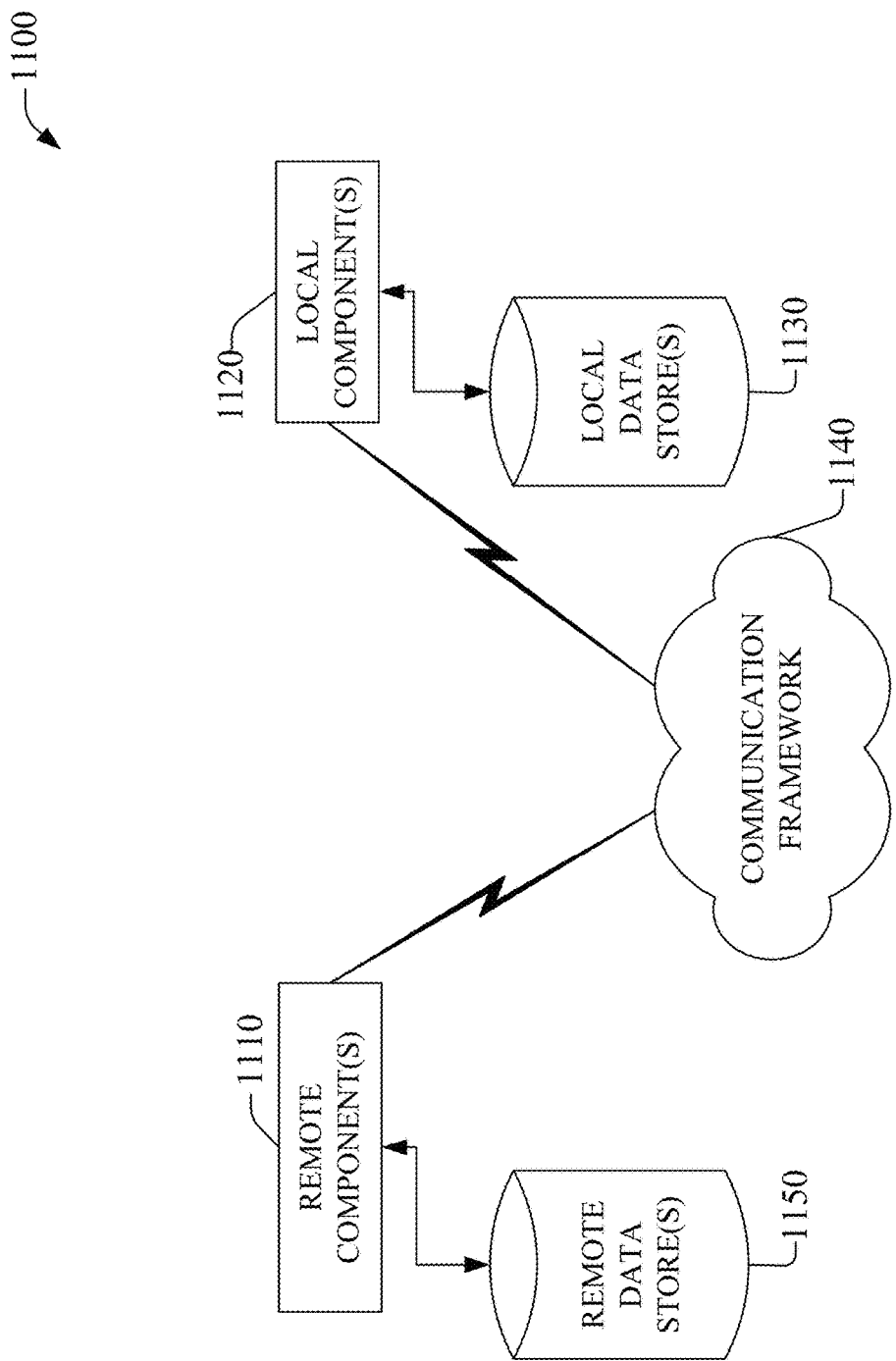
FIG. 11 depicts an example schematic block diagram of a computing environment with which the disclosed subject matter can interact.

FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can comprise servers, personal servers, wireless telecommunication network devices, etc. As an example, remote component(s) 1110 can be RAN devices that can be sources of RAN data 102-502, dispatching component 294, carrier planning component 299, POAC 522 and 524 relative to POAC 520, any distributed computing environment device, etc.

The system 1100 also comprises one or more local component(s) 1120. The local component(s) 1120 can be hardware and/or software (e.g., threads, processes, computing devices). In some embodiments, local component(s) 1120 can comprise, for example, POAC 120-520, etc.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

Figure 12:
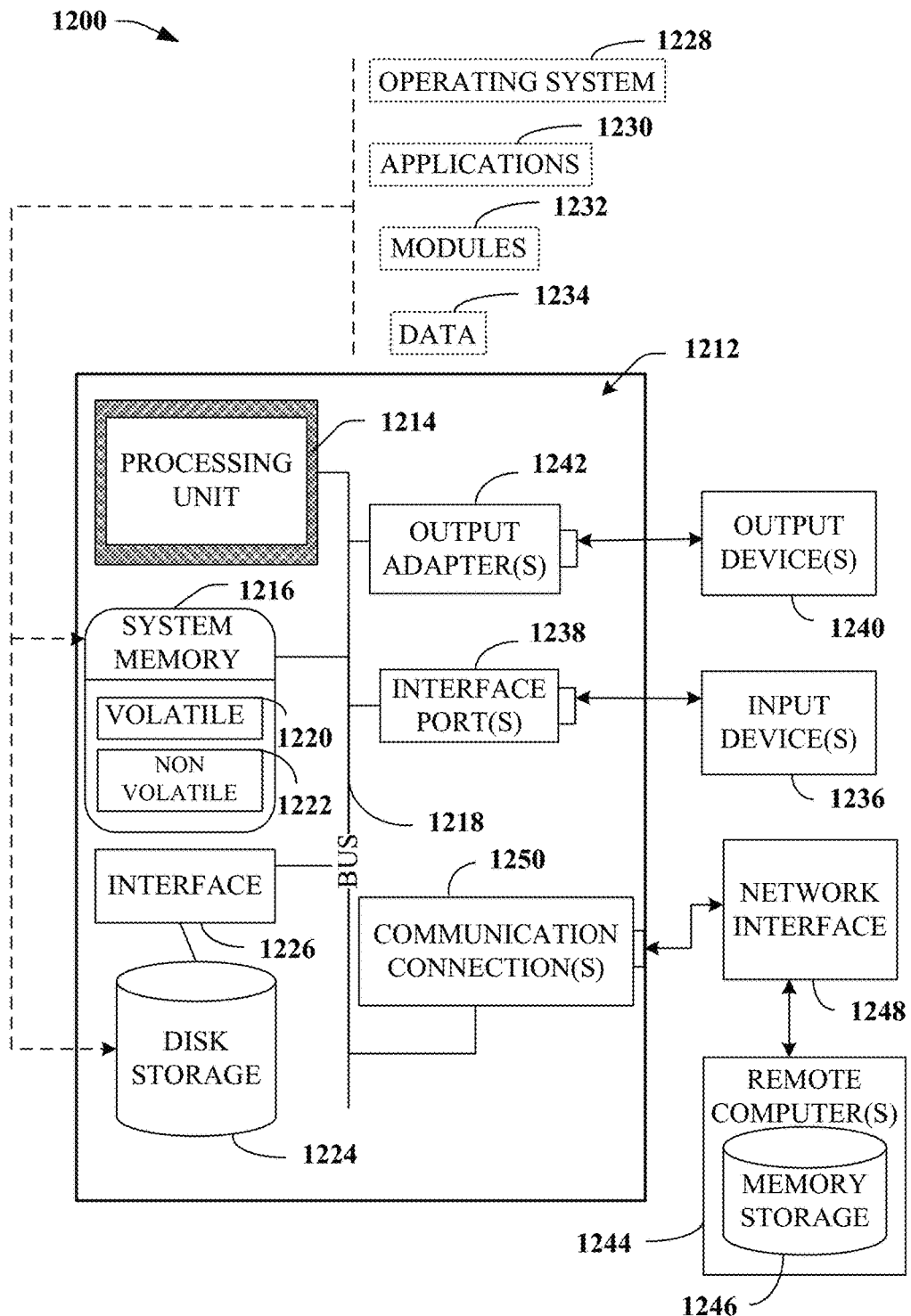
FIG. 12 illustrates an example block diagram of a computing system operable to execute the disclosed systems and methods in accordance with an embodiment.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1220 (see below), nonvolatile memory 1222 (see below), disk storage 1224 (see below), and memory storage 1246 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 12 illustrates a block diagram of a computing system 1200 operable to execute the disclosed systems and methods in accordance with an embodiment. Computer 1212, which can be, for example, POAC 120-520, 522, 524, etc., carrier planning component 299, dispatching component 294, mobile device 220, RAN device 222, etc., comprises a processing unit 1214, a system memory 1216, and a system bus 1218. System bus 1218 couples system components comprising, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1216 can comprise volatile memory 1220 and nonvolatile memory 1222. A basic input/output system, containing routines to transfer information between elements within computer 1212, such as during start-up, can be stored in nonvolatile memory 1222. By way of illustration, and not limitation, nonvolatile memory 1222 can comprise read only memory, programmable read only memory, electrically programmable read only memory, electrically erasable read only memory, or flash memory. Volatile memory 1220 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1212 can also comprise removable/non-removable, volatile/non-volatile computer storage media. FIG. 12 illustrates, for example, disk storage 1224. Disk storage 1224 comprises, but is not limited to, devices like a magnetic disk drive, floppy disk drive, tape drive, flash memory card, or memory stick. In addition, disk storage 1224 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1224 to system bus 1218, a removable or non-removable interface is typically used, such as interface 1226.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: receiving trigger information a remote device, e.g., a UE, and in response, generating communication augmentation information that can be accessed via an air interface or other wireless interface by one or more service interface components or other UEs to enable context sensitive communication augmentation.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software comprises an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be noted that the disclosed subject matter can be implemented with various operating systems or combinations of operating systems.

A user can enter commands or information into computer 1212 through input device(s) 1236. In some embodiments, a user interface can allow entry of user preference information, etc., and can be embodied in a touch sensitive display panel, a mouse input GUI, a command line controlled interface, etc., allowing a user to interact with computer 1212. As an example, carrier panning component 299, performance profile component 360, 460, etc., POAC 120-524, etc., can receive touch, motion, audio, visual, or other types of input. Input devices 1236 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 comprise, for example, a serial port, a parallel port, a game port, a universal serial bus, an infrared port, a Bluetooth port, an IP port, or a logical port associated with a wireless service, etc. Output device(s) 1240 use some of the same type of ports as input device(s) 1236.

Thus, for example, a universal serial busport can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 comprise, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected by way of communication connection 1250. Network interface 1248 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, comprising:
      receiving radio access network data of a mobile communication network comprising a radio access network device, wherein the radio access network data comprises a performance indicator value from the radio access network device, and wherein the radio access network device facilitates mobile communication via a mobile device attached to the radio access network device;
      selecting historical data relevant to an analysis of the performance indicator value;
      determining a performance outlier value related to the performance indicator value, wherein the determining the performance outlier value comprises determining, based on Pearson Product Moment Correlation, a correlation coefficient via a binary array embodying the performance indicator value and a historical performance indicator value of the historical data, and wherein the historical performance indicator value is related to an environmental event proximate to the radio access network; and
      enabling access to information related to the performance outlier value.

2. The device of claim 1, wherein the information related to the performance outlier value comprises the performance outlier value.

3. The device of claim 1, wherein the determining the performance outlier value is based on historical radio access network data comprising the historical performance indicator value.

4. The device of claim 3, wherein the performance indicator value and the historical performance indicator value are related by a characteristic of an operating environment of the radio access network device.

5. The device of claim 4, wherein the characteristic is a temporal characteristic pertaining to a time of operation of the operating environment.

6. The device of claim 4, wherein the characteristic is an event characteristic pertaining to an event determined to have occurred in the operating environment.

7. The device of claim 4, wherein the characteristic is a software characteristic of the radio access network device.

8. The device of claim 4, wherein the characteristic is a hardware characteristic of the radio access network device.

9. The device of claim 1, wherein the operations further comprise initiating a response based on the performance outlier value, in response to the correlation coefficient being determined to transition a correlation threshold value.

10. The device of claim 9, wherein the response is a repair response associated with repair of the radio access network device.

11. The device of claim 10, wherein the repair response associated with repair of hardware of the radio access network device.

12. The device of claim 10, wherein the repair response associated with alteration of software of the radio access network device.

13. The device of claim 9, wherein the response is a planning response associated with modifying a plan related to the deployment of a radio access network comprising the radio access network device.

14. The device of claim 9, wherein the response is an alert response associated with causing an alert related to the determining the performance outlier value.

15. The device of claim 9, wherein the coefficient threshold value is determined employing the binary array.

16. A method, comprising:
   receiving, by a system comprising a processor, radio access network data of a mobile communication network comprising a radio access network device, wherein the radio access network data comprises a performance indicator value and a historic performance indicator value corresponding to an environmental event proximate to the radio access network device and associated with the radio access network device supporting a mobile device in the mobile communication network, wherein the performance indicator value and the historic performance indicator value are determined to satisfy a similarity rule related to a characteristic of a historical radio access network operating environment profile, and wherein the historic performance indicator value is comprised in selectable historic radio access network data;
   determining, by the system based on a measure of the strength of a linear relationship between the performance indicator value and the historic performance indicator value, information related to a performance outlier via a binary array;
   enabling, by the system, access to the performance outlier value information;
   receiving, by the system, a performance profile comprising an updateable performance profile value; and
   initiating, by the system, a response event based on the performance outlier value information satisfying a response rule related to the updateable performance profile value.

17. The method of claim 16, wherein the similarity rule is related to a first temporal condition of the performance indicator value, a second temporal condition of the historic performance indicator value, and the characteristic of the historical radio access network operating environment profile is a temporal characteristic.

18. The method of claim 16, wherein the initiating the response event comprises initiating a repair response related to repair of the radio access network device.

19. A machine-readable storage medium, comprising executable instructions that, when executed by a processor, facilitate performance of operations, comprising:

receiving radio access network data of a mobile communication network comprising a radio access network device, wherein the radio access network data comprises a performance indicator value and a historic performance indicator value related to an environmental event proximate to the radio access network device and associated with the radio access network device enabling mobile communication via a mobile device attached to the radio access network device, wherein the performance indicator value and the historic performance indicator value satisfy a similarity rule related to a characteristic of a historically similar radio access network operating environment profile, and wherein the historic performance indicator value is comprised in historic radio access network data that is determined to be relevant to an outlier analysis relative to the performance indicator value;

determining, by the system based on a best fit line computed from performance indicator values comprising the performance indicator value and historic performance indicator values comprising the historic performance indicator value, information related to a performance outlier value via a binary array; and initiating, by the system, a response event based on the performance outlier value information being determined to have satisfied a trigger rule related to a trigger value.

20. The machine-readable storage medium of claim 19, wherein the determining the information related to the performance outlier value is performed via a distributed computing environment comprising a first computing device that processes a first computing subtask that represents a first portion of a larger computing task and a second computing device that processes a second computing subtask that represents a second portion of the larger computing task.

* * * * *